US012157248B2

(12) United States Patent
Cabrit

(10) Patent No.: US 12,157,248 B2
(45) Date of Patent: Dec. 3, 2024

(54) LOG DOG AND ADJUSTABLE LOG DOG SET BAR ASSEMBLY

(71) Applicant: Norwood Industries Inc., Oro-Medonte (CA)

(72) Inventor: Sebastien Cabrit, Oro-Medonte (CA)

(73) Assignee: Norwood Industries Inc., Oro-Medonte (CA)

( * ) Notice: Subject to any disclaimer, the term of this patent is extended or adjusted under 35 U.S.C. 154(b) by 297 days.

(21) Appl. No.: 17/456,912

(22) Filed: Nov. 30, 2021

(65) Prior Publication Data

US 2022/0168919 A1 Jun. 2, 2022

(30) Foreign Application Priority Data

Nov. 30, 2020 (CA) ..................................... 3101140

(51) Int. Cl.
*B27B 29/02* (2006.01)
*B27B 29/10* (2006.01)

(52) U.S. Cl.
CPC .............. *B27B 29/02* (2013.01); *B27B 29/10* (2013.01)

(58) Field of Classification Search
CPC .......... B27B 29/02; B27B 29/10; B27B 29/00
USPC .............................................................. 83/56
See application file for complete search history.

(56) References Cited

U.S. PATENT DOCUMENTS 937,480 A * 10/1909 Smith .................... F16M 13/02 211/119.006
1,543,216 A 6/1925 Martin
4,697,487 A 10/1987 Cameron
5,135,037 A * 8/1992 Wijesinghe ............. B27B 29/10 144/242.1
6,629,549 B2 * 10/2003 Rioux .................. B23D 53/001 144/365
(Continued)

FOREIGN PATENT DOCUMENTS

CN 101569945 A 11/2009
CN 103124610 A 5/2013
(Continued)

OTHER PUBLICATIONS

Extended European Search Report issued for related European Convention Application No. 21211132, mailed Apr. 7, 2022.
(Continued)

*Primary Examiner* — Nhat Chieu Q Do
(74) *Attorney, Agent, or Firm* — Renner, Otto, Boisselle & Sklar, LLP.

(57) ABSTRACT

The present subject matter relates to a log dog, a kit thereof, a set bar assembly, and a log bed with the log dog and set bar assembly. The log dog includes a rod with a groove, and a head block with a cylindrical cavity for receiving the groove and with a bore extending through the sidewall. A pin extends through the bore to the cylindrical cavity for rotatable engagement with the groove to releasably hold the head block to the rod. The set bar assembly includes a pair of mounting brackets with a holder having lower and upper sections. A support bar is secured between the mounting brackets and a pivot arm extends from the support bar. The set bar assembly includes a stop bar received in the holder, wherein moving the stop bar between the lower and upper sections of the holder lowers and raises the pivot arm.

7 Claims, 25 Drawing Sheets

(56) References Cited

U.S. PATENT DOCUMENTS

| | | | | |
|---|---|---|---|---|
| 8,695,652 | B1 * | 4/2014 | Pattullo | B27B 1/00 269/131 |
| 2007/0234869 | A1 | 10/2007 | Dale | |
| 2011/0278780 | A1 | 11/2011 | Lucas | |
| 2013/0283991 | A1 | 10/2013 | Belzile | |

FOREIGN PATENT DOCUMENTS

| | | | | | |
|---|---|---|---|---|---|
| CN | 111702871 | A | | 9/2022 | |
| GB | 2026354 | A | * | 2/1980 | B23B 31/1078 |
| WO | WO-9416846 | A1 | * | 8/1994 | B23B 23/02 |

OTHER PUBLICATIONS

Office Action Issued for related Chinese Convention Application No. 202111404968, mailed Jul. 8, 2022.

* cited by examiner

LOG DOG AND ADJUSTABLE LOG DOG SET BAR ASSEMBLY

RELATED APPLICATION

This application claims priority of Canadian Application No. 3,101,140, filed Nov. 30, 2020, which is hereby incorporated herein by reference in its entirety.

FIELD

The specification relates to a log dog, a log dog set bar assembly, a log bed having the log dog assembly, and a kit for assembling the log dog.

BACKGROUND

One of the challenging aspects in sawmilling is the actual handling of the logs, since the logs are largely cylindrical and can be heavy and awkward. Proper sawmill operations require that the log to be sawn be firmly clamped into position so that it cannot move during milling. Log clamping requires several elements—multiple horizontal cross bunks as part of a log bed on which the log lays, one or more vertical log rests against which the log rests, and one or more vertical log dogs (clamps) which firmly hold and lock the log against the log rest(s).

The log dog and log rest are fixed or releasably coupled to the log bed in order to hold the log in position on the log bed. The bed, log dog, and log rest collectively hold the log in place, effectively forming a 3 sided clamp for cutting along the fourth “side” of the log.

The rough uneven edges of a log are best gripped by a log dog with a pointed head portion, which is used to at least partially embed into the log in order to help grasp the log. As each side of the log is cut flat, the log is rotated to cut the next side. Each side of the log is thus milled from a rough rounded edge to a straight flat edge, often referred to as a “green” side. Each green side may become a finished board. Thus embedding the pointed head of the log dog into the log would damage the board, by creating an indentation or scratch on a sawn or cut surface of the log. Thus a flat, blunt edge is preferred on the log dog for clamping such milled wood surfaces.

One solution is to have removable head on the log dog for contacting a cut side of the log. Either a flat head or a pointed head can thus be removed to expose the alternative, as required. However, known log dogs are designed to drop down when released. A removable head will easily fall off the connecting rod when the head is not abutting the log.

For the log dog to engage with the log, the log dog must be supported above the log bed of the sawmill. When clamping the log, the log dog is firmly held and secured above the log bed. When moving the log, the log dog must not become an obstacle. Thus, when released to rotate the log, known log dogs drop below the log bed, where they are hard for the operator to retrieve when they are needed next. Unfortunately, known log dogs can also become vibrated loose by the milling and fall below the log bed, thus releasing a log that should remain clamped for the entire cut.

During cutting, the log diameter decreases, thus requiring adjustments to both the vertical and horizontal position of the log dog. The vertical must be adjusted to maintain a tight clamp on the log, and the horizontal must be adjusted to keep the log dog out of the line of the cutting blade.

Thus, there is a need in the art for a log dog that permits the operator to set the log dog against a rough log edge with a pick, and against the finished log edge with a flat, without risk of the log dog head falling off. There is also a need for a log dog that permits easy adjustment both vertically and horizontally, that is resistant to being shaken loose by milling even when clamped low, and that remain easily accessible to the operator when not in use. Moreover, there is a need in the art for a kit for retrofitting a log dog to a portable sawmill with the above desired characteristics.

SUMMARY OF INVENTION

In one aspect, a log dog is provided for holding a log in place on a log bed in a sawmill, the log dog comprising a rod having a connecting end with a groove positioned proximate the connecting end; and a head block for contacting the log on the log bed, the head block releasably coupled to the rod and having a front face, a rear face and a sidewall extending therebetween, a cylindrical cavity extending from the rear face towards the front face, the cylindrical cavity dimensioned to receive the connecting end and the groove of the rod therein; a bore extending through the sidewall to the cylindrical cavity; and a pin removably extending through the bore to the cylindrical cavity and engaging with the groove of the rod to hold the head block to the rod.

In another aspect, the bore extends from an aperture in the sidewall, generally tangential to the cylindrical cavity, to another aperture in the sidewall. In another aspect, the pin has a head, an opposed tip, and a shaft therebetween, at least a portion of the shaft being situated within the cylindrical cavity for engagement with the groove of the rod. In another aspect, the head of the pin is situated proximate the aperture in the sidewall, and the tip of the pin is situated proximate the other aperture in the sidewall. In another aspect, the groove on the rod extends circumferentially around the rod. In another aspect, the groove has a half-circle, cross-sectional shape with a diameter that generally corresponds with a diameter of the shaft of the pin. In another aspect, the head of the pin comprises a gripping component for a user to grasp when inserting or removing the pin from the head block.

The invention also teaches a kit for assembling into a log dog for holding a log in place on a log bed in a sawmill, the kit comprising a rod having a connecting end with a groove positioned proximate the connecting end; a head block for contacting the log on the log bed, the head block having: a front face, a rear face and a sidewall extending therebetween, a cylindrical cavity extending from rear face towards the front face, the cylindrical cavity dimensioned to receive the connecting end and the groove of the rod therein; a bore extending through the sidewall to the cylindrical cavity; and a pin dimensioned to extend through the bore of the head block to the cylindrical cavity for engaging with the groove of the rod to releasably hold the head block to the rod.

In another aspect, the bore extends from an aperture in the sidewall, generally tangential to the cylindrical cavity, to another aperture in the sidewall. In another aspect, the pin has a head, an opposed tip, and a shaft therebetween for engagement with the groove of the rod within the cylindrical cavity when the pin is situated in the bore. In another aspect, the groove on the rod extends circumferentially around the rod. In another aspect, the groove has a half-circle profile with a diameter that generally corresponds with a diameter of the shaft of the pin. In another aspect, the head of the pin comprises a gripping component for a user to grasp when inserting or removing the pin from the head block.

The invention also teaches a set bar assembly for securing a log dog to a log bed in a sawmill, the set bar assembly comprising a first mounting bracket and a second mounting bracket adapted to be secured to the log bed, the first mounting bracket having a first holder with a lower section and an upper section that is vertically offset from the lower section; a support bar secured between the first and second mounting brackets; a pivot bar pivotably coupled to, and extending from, the support bar to a distal end for releasable securement to the log dog therewith; and a stop bar extending between the first and second mounting brackets for supporting the pivot bar, the stop bar having a first end adapted to be held by the lower section or the upper section of the first holder, and slidable therebetween; wherein sliding the first end of the stop bar to the lower section lowers the pivot arm relative to the mounting brackets, and sliding the first end to the upper section raises the pivot arm relative to the mounting brackets.

In another aspect, the second mounting bracket has a second holder with another lower section and another upper section, the other lower section being vertically offset from the other upper section. In another aspect, the stop bar extends to the second mounting bracket with a second end that is adapted to be held by the other lower section or the other upper section of the second holder, and slidable therebetween. In another aspect, the first holder is a first cutout in the first mounting bracket. In another aspect, the first cutout has an inverted bean shape. In another aspect, the second holder is a second cutout in the second mounting bracket. In another aspect, the second cutout is a mirror image of the first cutout. In another aspect, the pivot arm rests on the support bar for operative engagement therewith. In another aspect, the pivot arm is slidably coupled to the support bar.

The invention also teaches a set bar assembly wherein the log dog comprises: a rod having a connecting end with a groove positioned proximate the connecting end; and a head block for contacting the log on the log bed, the head block releasably coupled to the rod and having a front face, a rear face and a sidewall extending therebetween, a cylindrical cavity extending from the rear face towards the front face, the cylindrical cavity dimensioned to receive the connecting end and the groove of the rod therein; a bore extending through the sidewall to the cylindrical cavity; and a pin removably extending through the bore to the cylindrical cavity and engaging with the groove of the rod to hold the head block to the rod.

The invention also teaches a log bed for use in a sawmill, the log bed defining a top plane on which a log may be supported, the log bed comprising a deck having a pair of rails, and multiple cross bunks extending between the rails; and the set bar assembly of the invention, the first and second mounting brackets being secured to the deck, wherein moving the first end of the stop bar to the upper section of the first holder raises at least a portion of the log dog, secured to the distal end of the pivot arm, above the top plane of the log bed for engagement with the log, and wherein moving the first end of the stop bar to the lower section of the first holder lowers the log dog below the top plane of the log bed.

In another aspect, the first mounting bracket is secured to one of the rails, the second mounting bracket being secured to the other one of the rails. In another aspect, the support bar and the stop bar extend generally parallel to the cross bunks, and the pivot arm extends generally perpendicular to the cross bunks.

The invention also teaches a sawmill comprising a log bed of any the invention defining a first translation axis, a carriage mounted to the bed for movement along the first translation axis; and a sawhead secured to the carriage for movement along the first translation axis relative to the log bed.

BRIEF DESCRIPTION OF THE DRAWINGS

Reference will now be made, by way of example, to the accompanying drawings which show example embodiments of the present application, and in which.

Similar reference numerals are used in different figures to denote similar components.

DESCRIPTION OF EXAMPLE EMBODIMENTS

Figure 1:
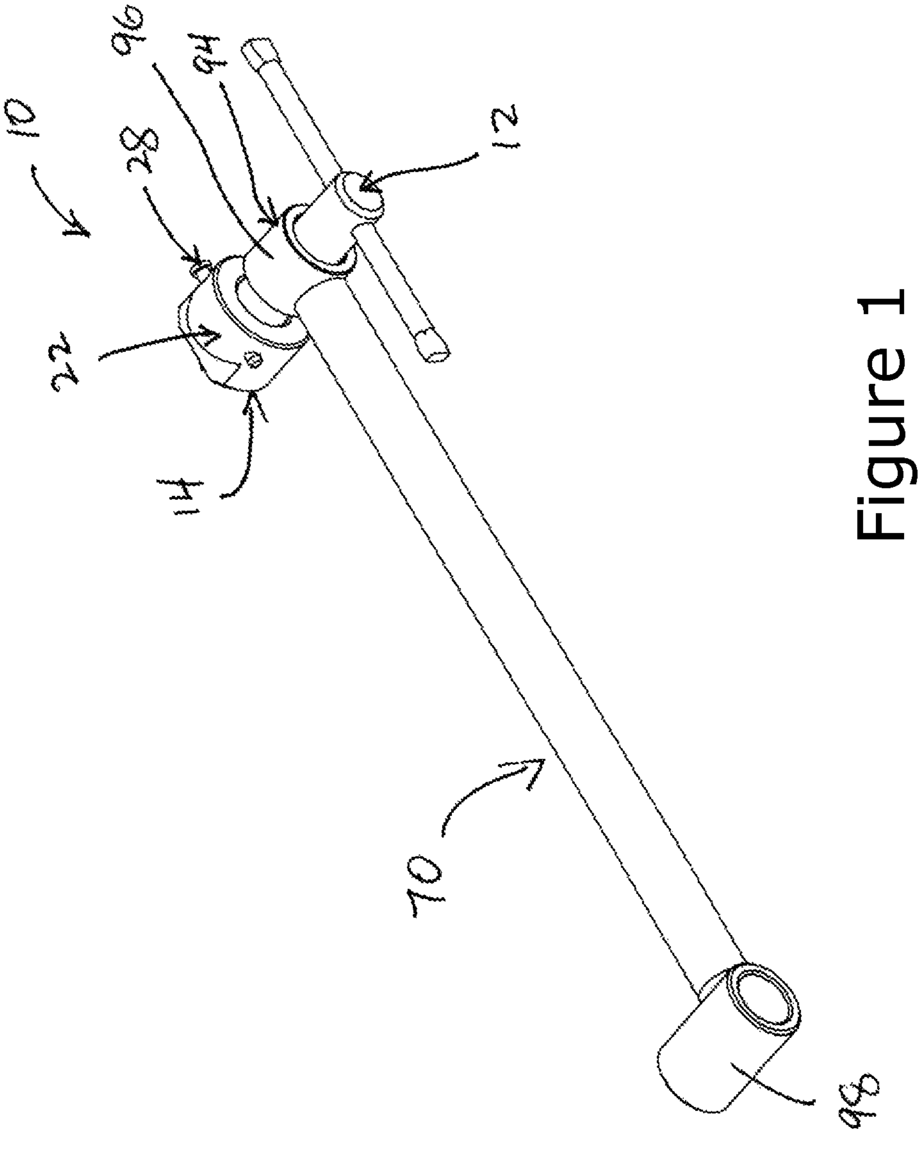
FIG. 1 is an upper, front perspective view of a log dog according to an embodiment of the present invention with a pivot arm.

As illustrated in the Figures, the present invention provides a log dog 10 and a set bar assembly 60 for holding a log in place on a log bed 100 in a sawmill. For a overview of the log dog 10 in relation to a log and a log bed, see FIGS. 20-25.

FIGS. 1-6 illustrate log dog 10 according to an embodiment of the present invention with a pivot arm 70. In that regard, log dog 10 generally includes a rod 12 with a head block 14 releasably coupled to rod 12.

Rod 12 is adapted to be securable to the log bed and is shown having a generally cylindrical body 16 with a connecting end 18. Connecting end 18 (FIG. 6) is adapted to be releasably coupled to head block 14. In the present case, connecting end 18 is dimensioned to be received within head block 14.

A groove 20 is positioned proximate connecting end 18 in cylindrical body 16 for coupling with head block 14. In the depicted embodiment, groove 20 on rod 12 extends circumferentially around rod 12 and has a half-circle, cross-sectional shape. In an alternate embodiment, groove 20 may only extend partway around rod 12, and/or groove 20 may have a different cross-sectional shape, such as an oblong or rectangular profile Head block 14 is configured for contacting the log on the log bed. In that regard, head block 14 may have a variety of different shapes and configurations. In the present case, head block 14 has an exterior surface 22, a cylindrical cavity 24 (FIG. 2), a bore 26 extending through an interior surface 23 and cylindrical cavity 24, and a pin 28 for engagement with groove 20 and bore 26.

Exterior surface 22 has a front face 30, a rear face 32, and a sidewall 34 extending therebetween. As depicted, front face 30 has a pointed portion 36, which may be used to at least partially embed into the log in order to help hold the log in place on a log bed to hold it in place.

A "flat" portion 38 in sidewall 34 of log dog 10 may be pressed against a cut side of a log in order to help hold the log in place, while not damaging the cut surface.

Rear face 32 (FIG. 6) has an opening 40 (FIG. 2) with cylindrical cavity 24 extending from opening 40 in rear face 32 towards front face 30. Cylindrical cavity 24 is dimensioned to receive connecting end 18 and groove 20 of rod 12 therein. In that regard, a diameter of connecting end 18 is slightly smaller than a diameter of cylindrical cavity 24, so connecting end 18 can be slidably received within cylindrical cavity 24 of head block 14.

However, as noted above, head block 14 can easily fall off rod 12, especially when head block 14 is not engaged with, or abutting against, a log. This is particularly a problem when the log dog 10 is allowed to drop below the log bed.

Figure 3:
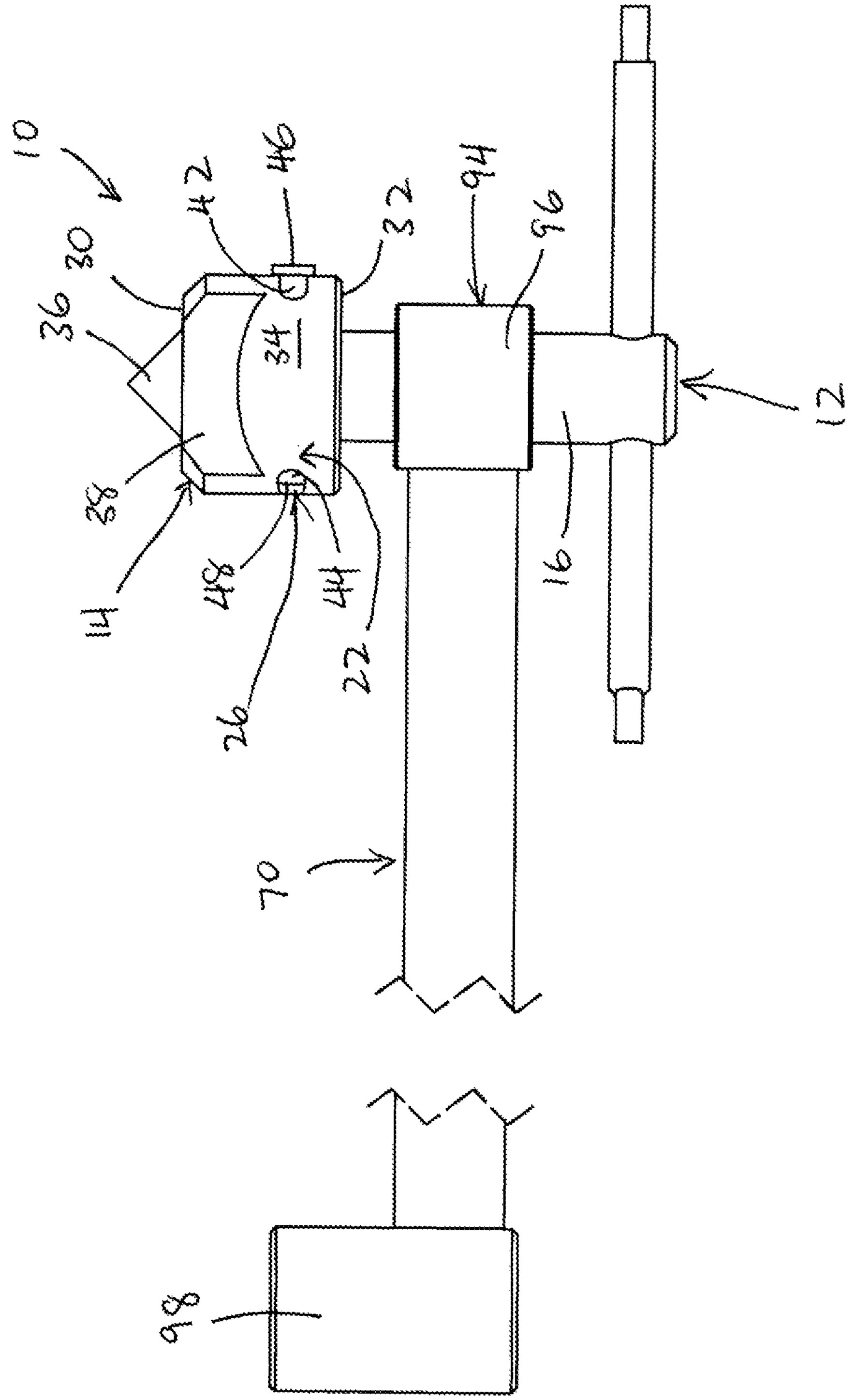
FIG. 3 is a plan view of the log dog and pivot arm of FIG. 1.
Figure 4:
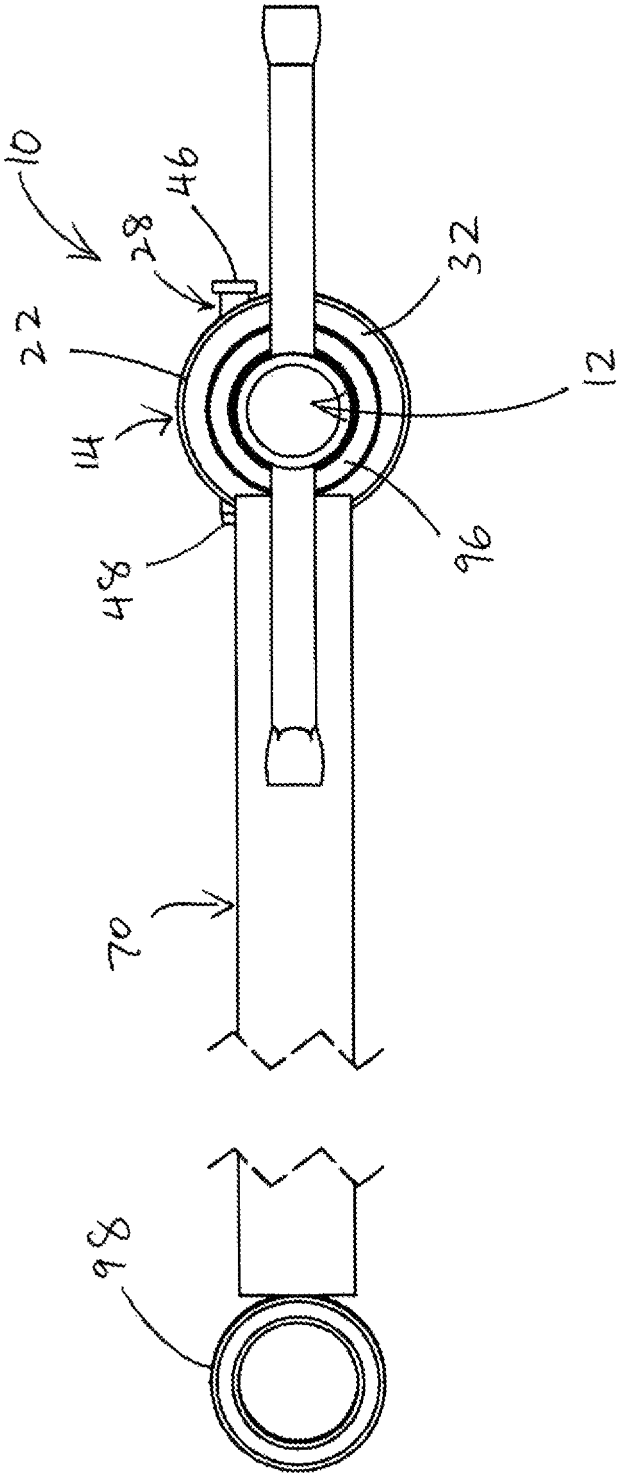
FIG. 4 is a rear elevational view of the log dog and pivot arm of FIG. 1.
Figure 5:
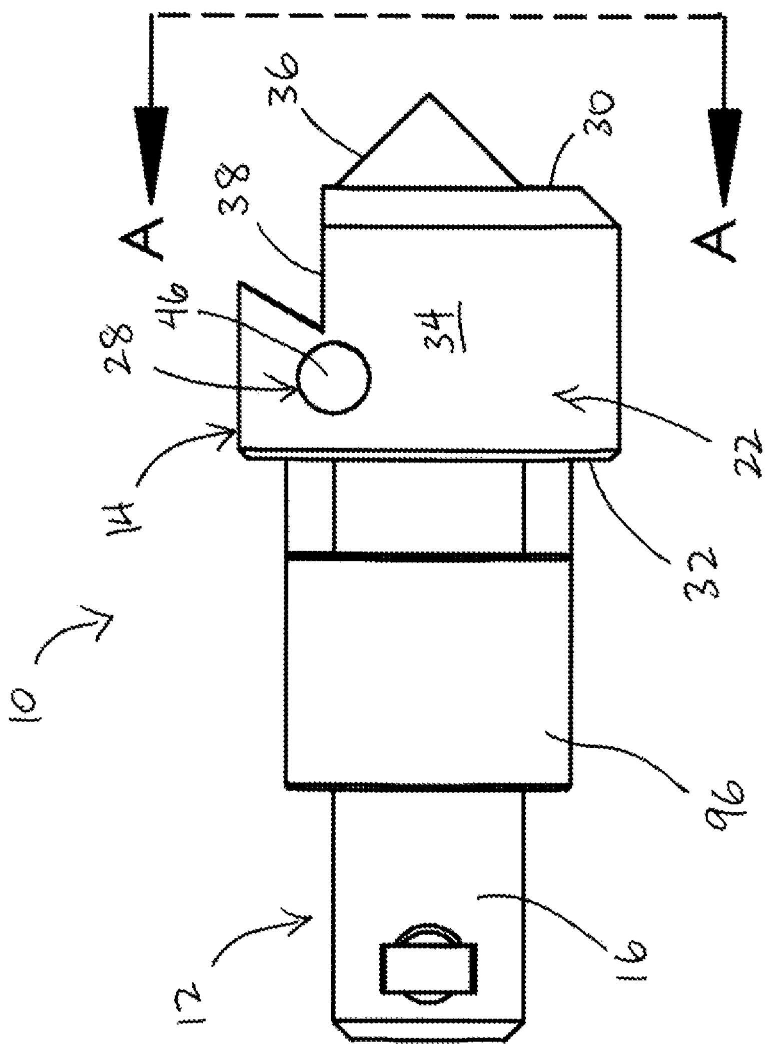
FIG. 5 is a side elevational view of the log dog and the distal end of pivot arm of FIG. 1.

To address this problem, head block 14 includes bore 26 that extends through sidewall 34 to cylindrical cavity 24. In the depicted embodiment, bore 26 extends generally tangential to cylindrical cavity 24, from an aperture 42 in sidewall 34, past cylindrical cavity 24, to another aperture 44 in sidewall 34 (FIG. 3).

In an alternate embodiment, bore 26 may instead extend from aperture 42 in sidewall 34, and terminate once it reaches cylindrical cavity 24. In a yet further alternate embodiment, bore 26 may instead extend towards cylindrical cavity 24, perhaps radially, from aperture 42.

Head block 14 further includes pin 28 that removably and slidably extends through bore 26 of head block 14 into cylindrical cavity 24 and slidably engages with groove 20 of rod 12 to releasably hold head block 14 to rod 12. Pin 28 is shown with a head 46, an opposed tip 48, and a cylindrical shaft 50 extending therebetween. At least a portion of shaft 50 is situated within cylindrical cavity 24 for engagement with groove 20 of rod 12.

Figure 6:
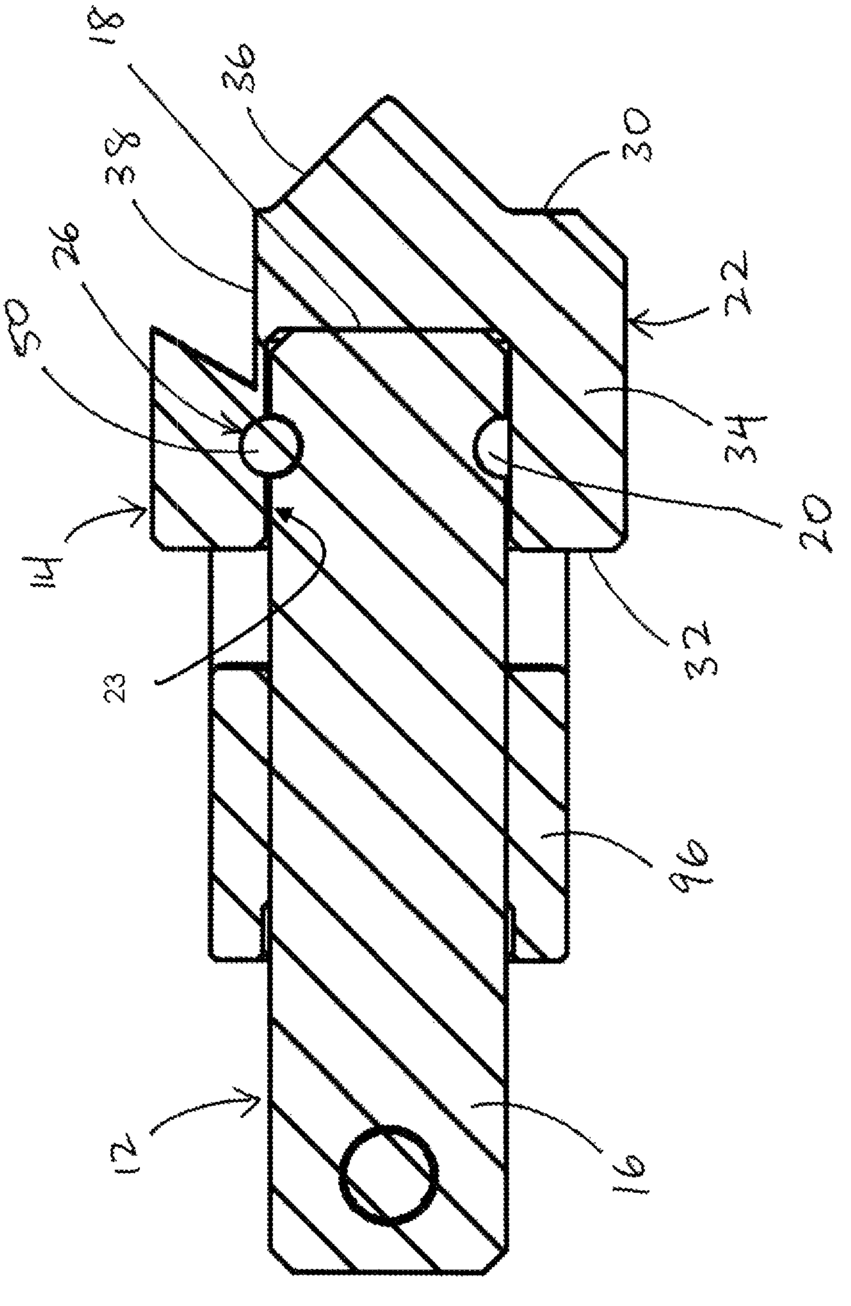
FIG. 6 is a cross-sectional view along line A-A in FIG. 5.
Figure 7:
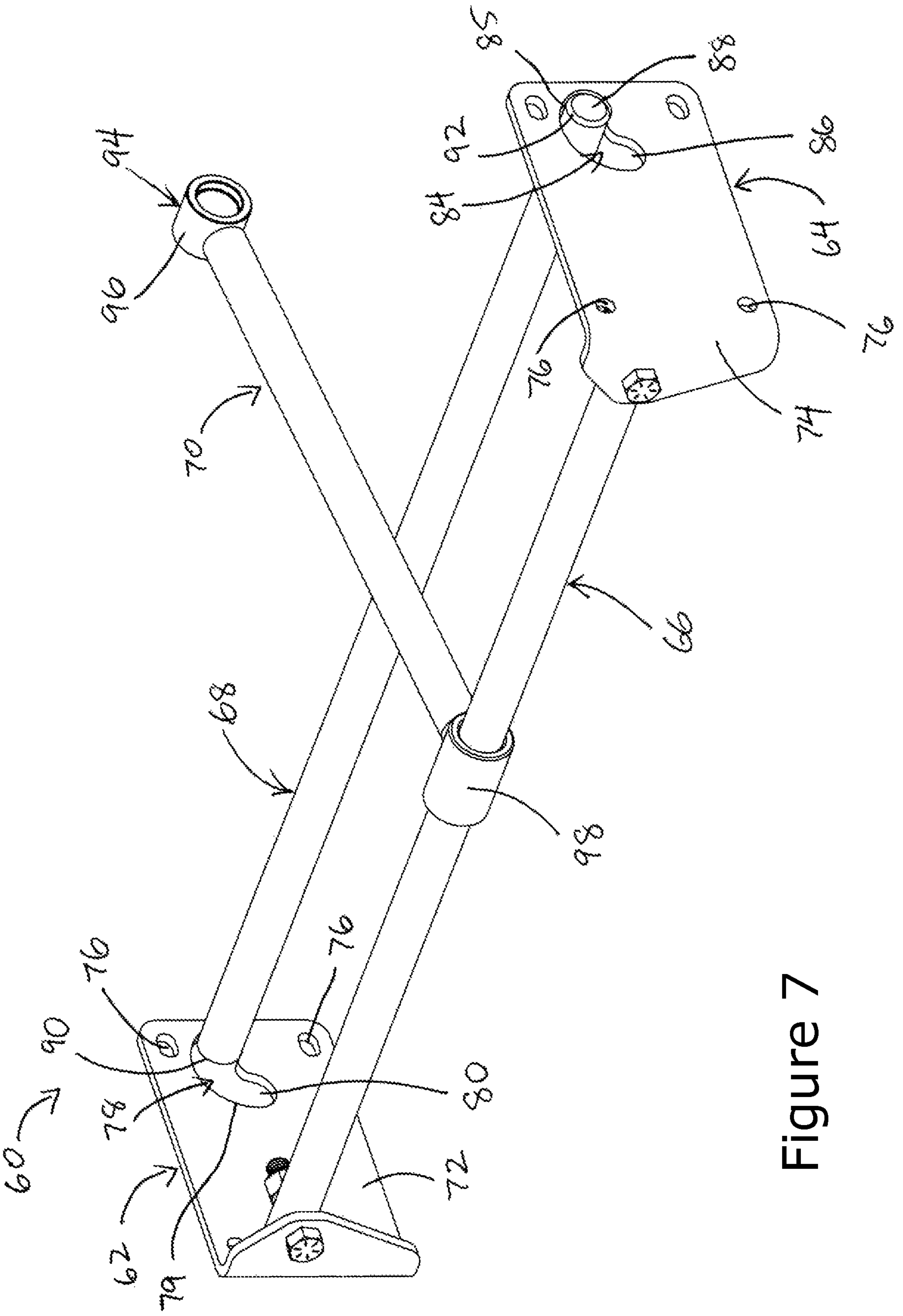
FIG. 7 is an upper, front perspective view of a set bar assembly with the stop bar in a raised configuration, for use with a log dog, according to an embodiment of the present invention.
Figure 8:
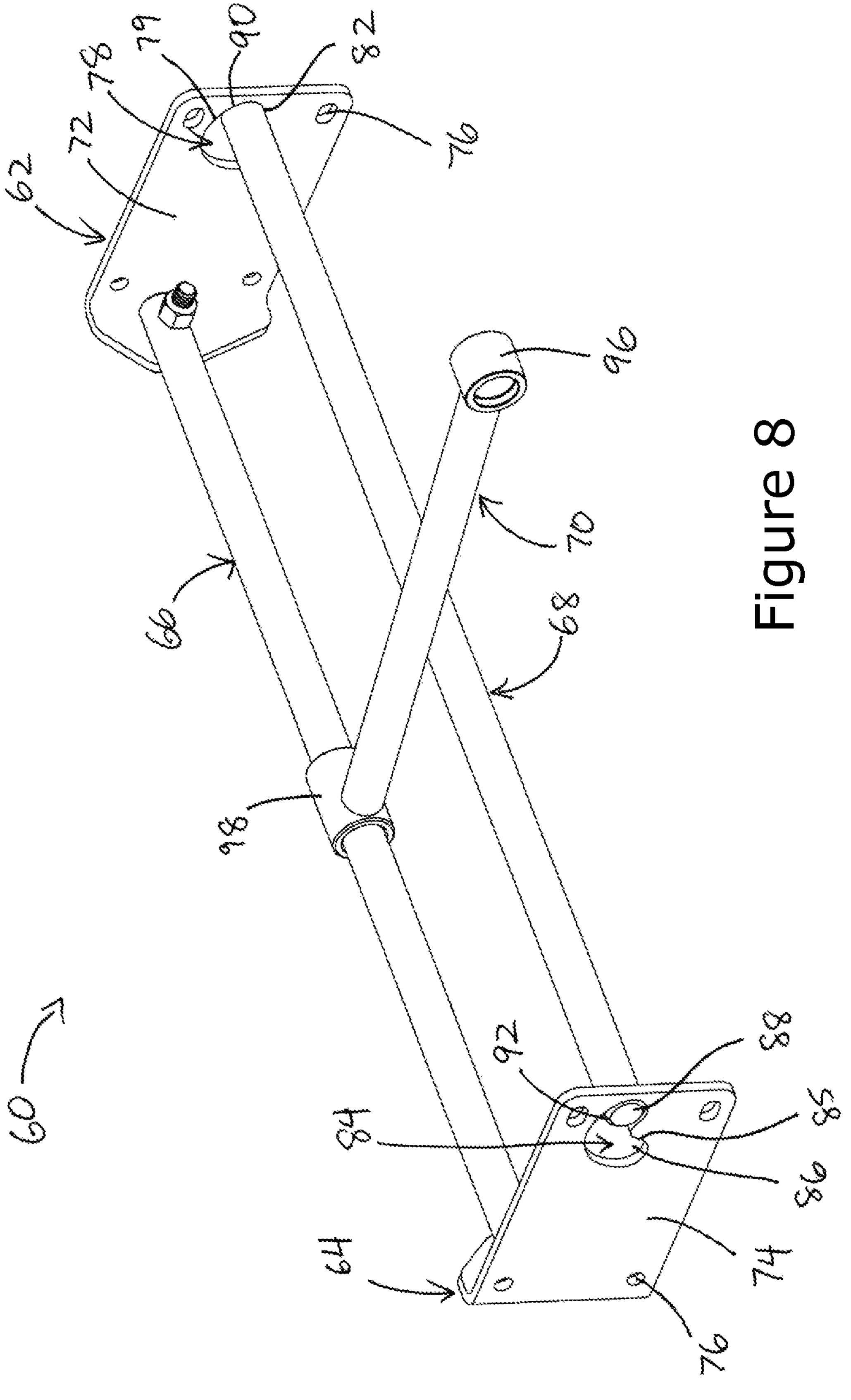
FIG. 8 is an upper, rear perspective view of the set bar assembly of FIG. 7.
Figure 9:
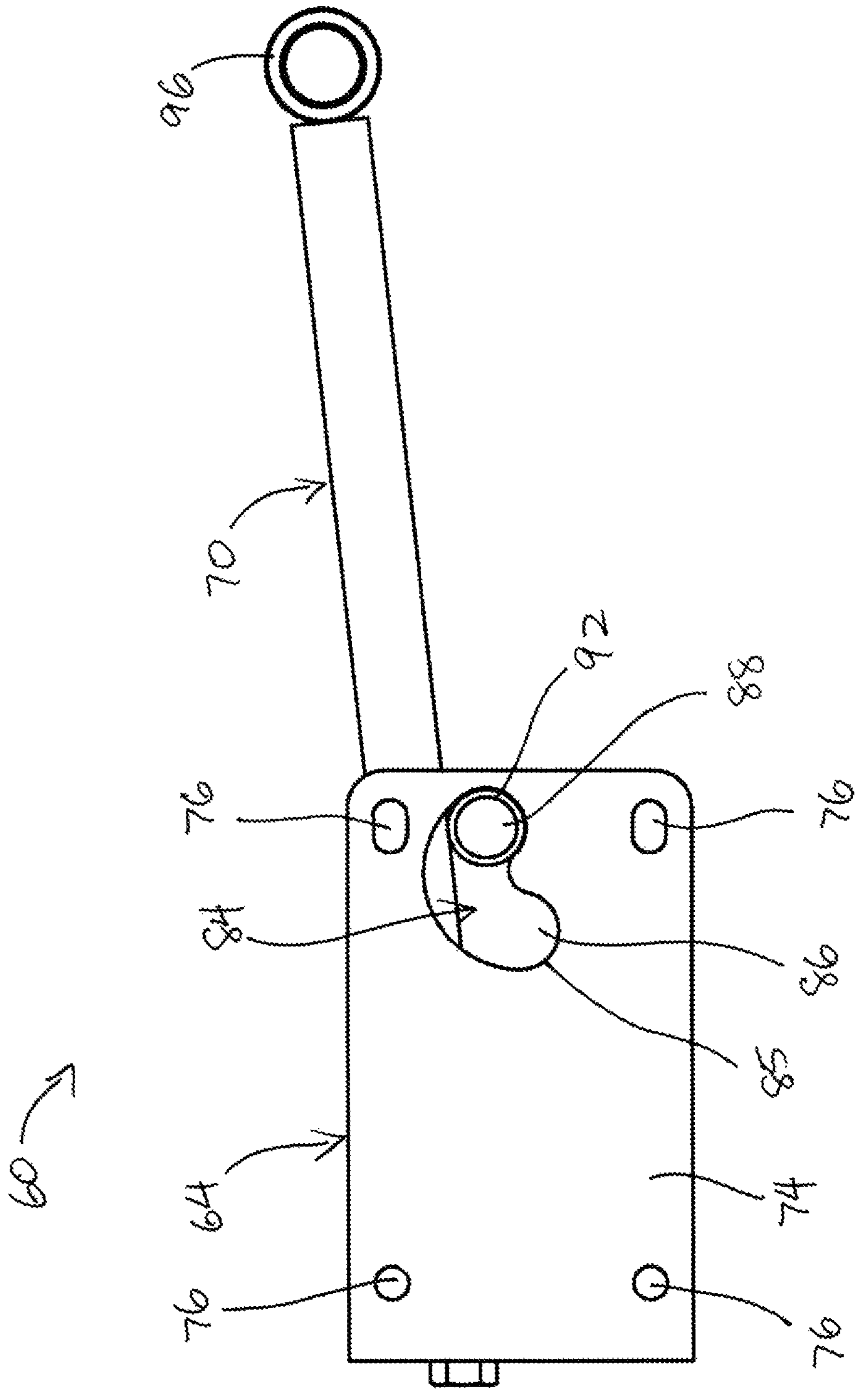
FIG. 9 is a side elevational view of the set bar assembly of FIG. 7.
Figure 10:
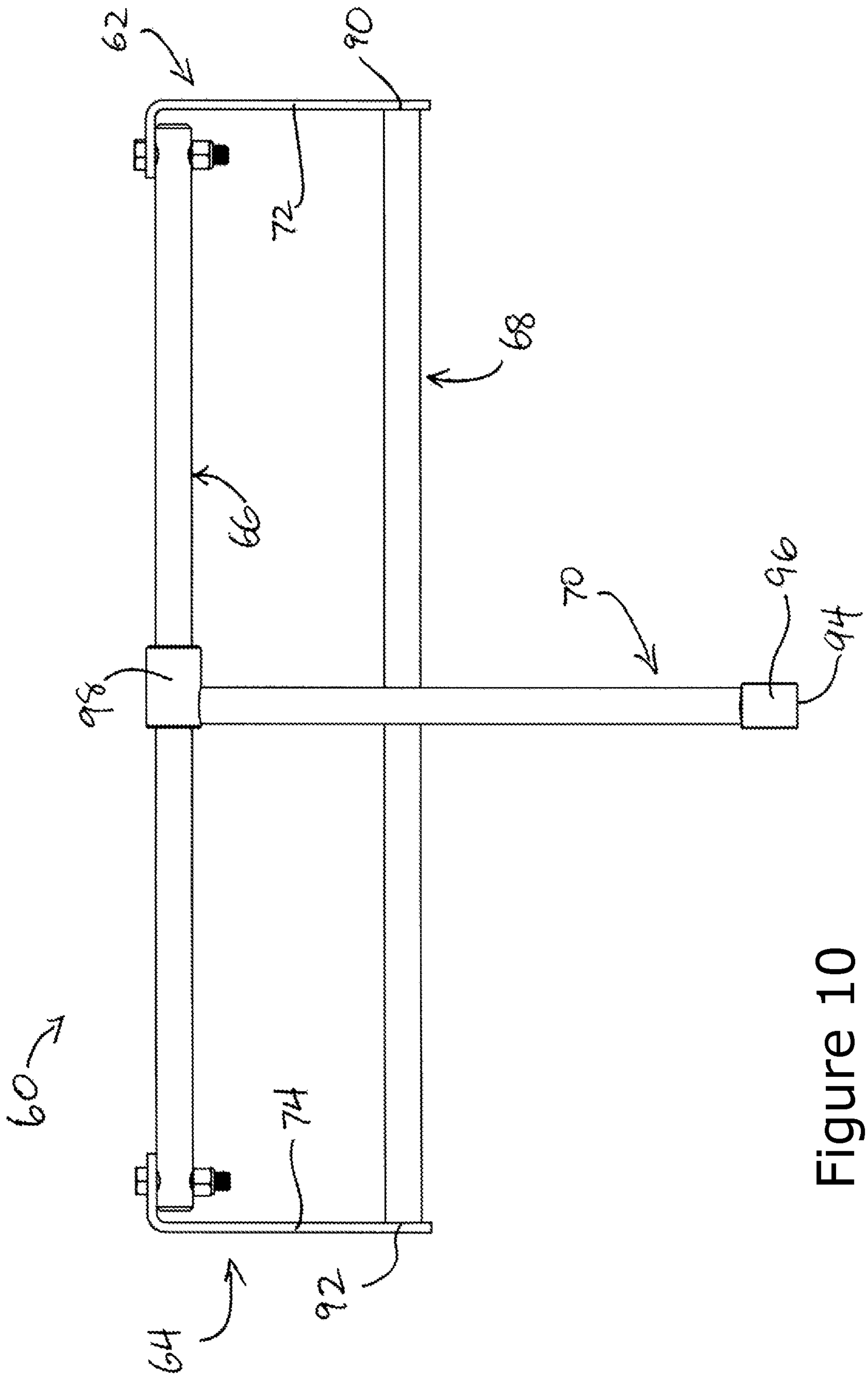
FIG. 10 is a plan view of the set bar assembly of FIG. 7.
Figure 11:
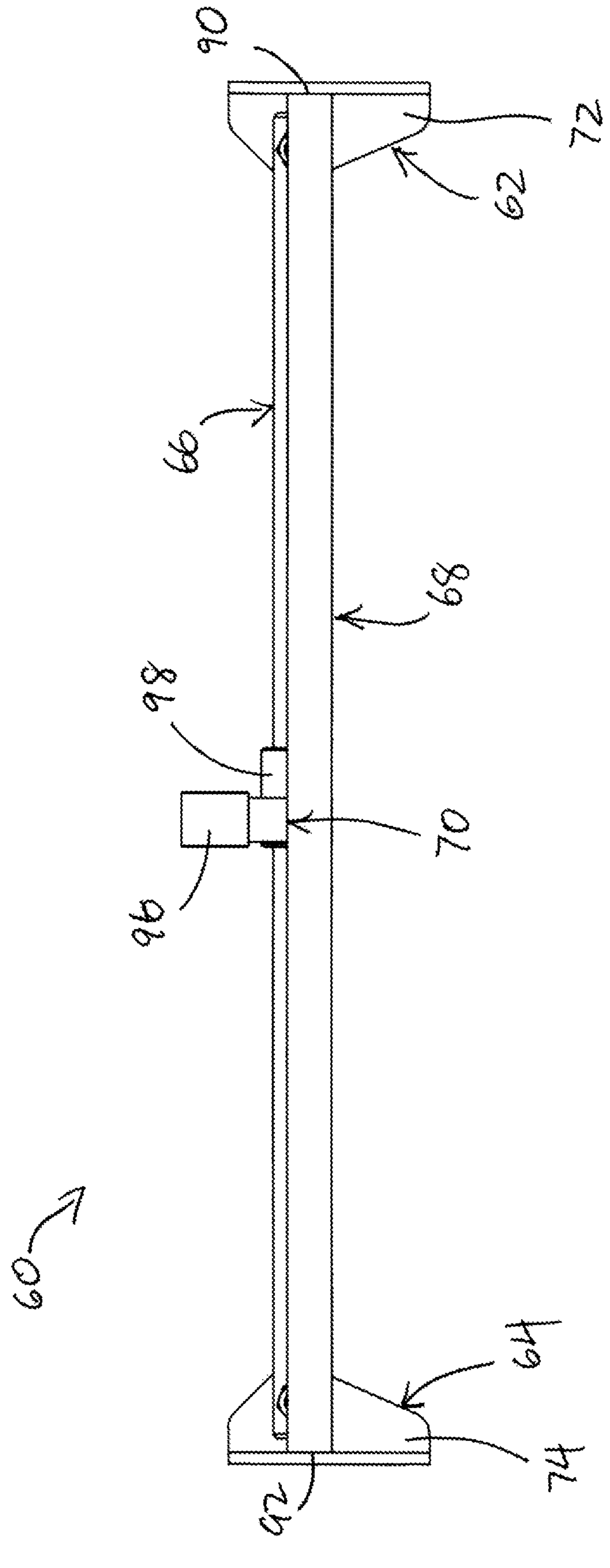
FIG. 11 is a rear elevational view of the set bar assembly of FIG. 7.
Figure 12:
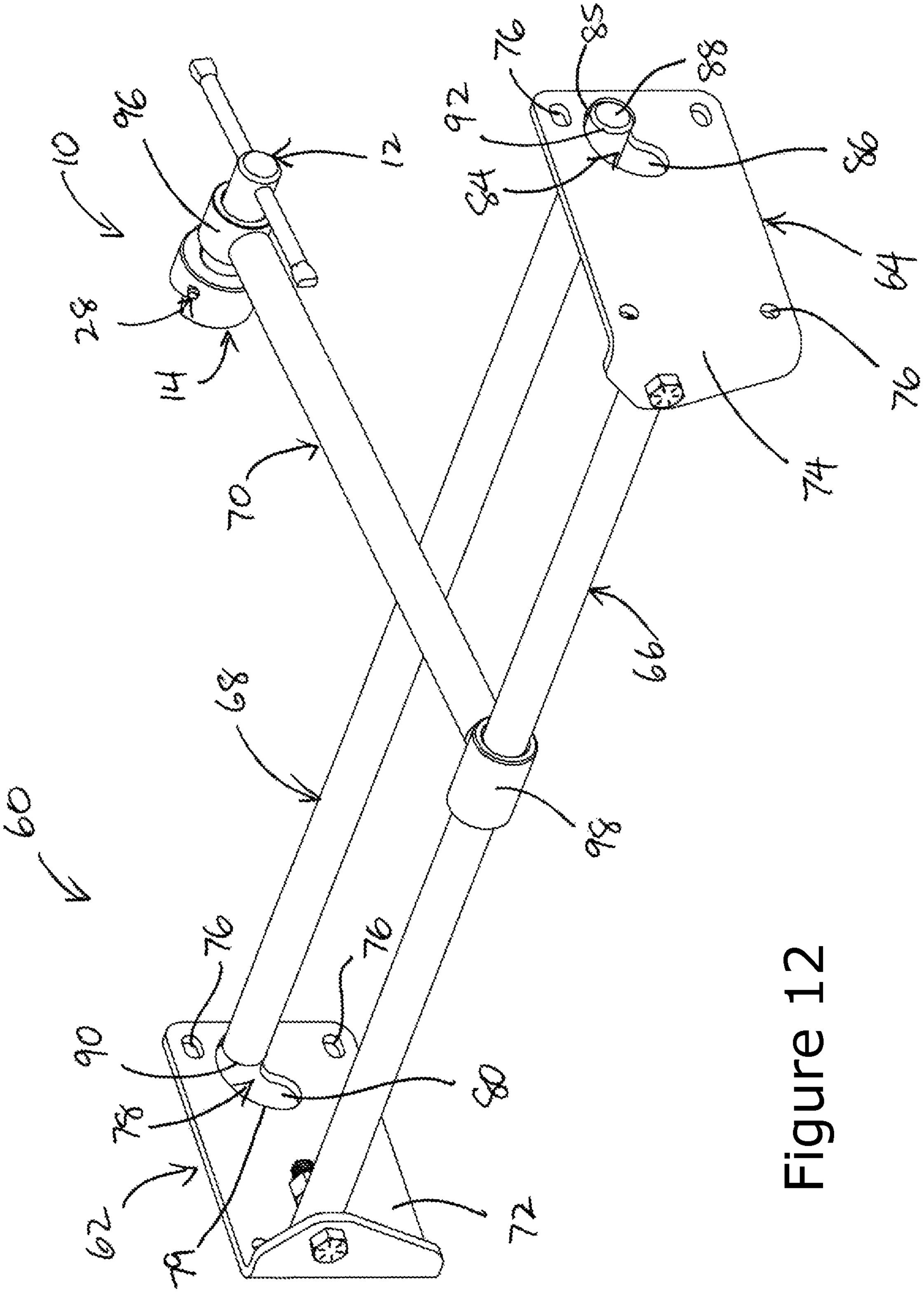
FIG. 12 is a side front perspective view of the set bar assembly of FIG. 7 in use with the log dog of FIG. 1.
Figure 13:
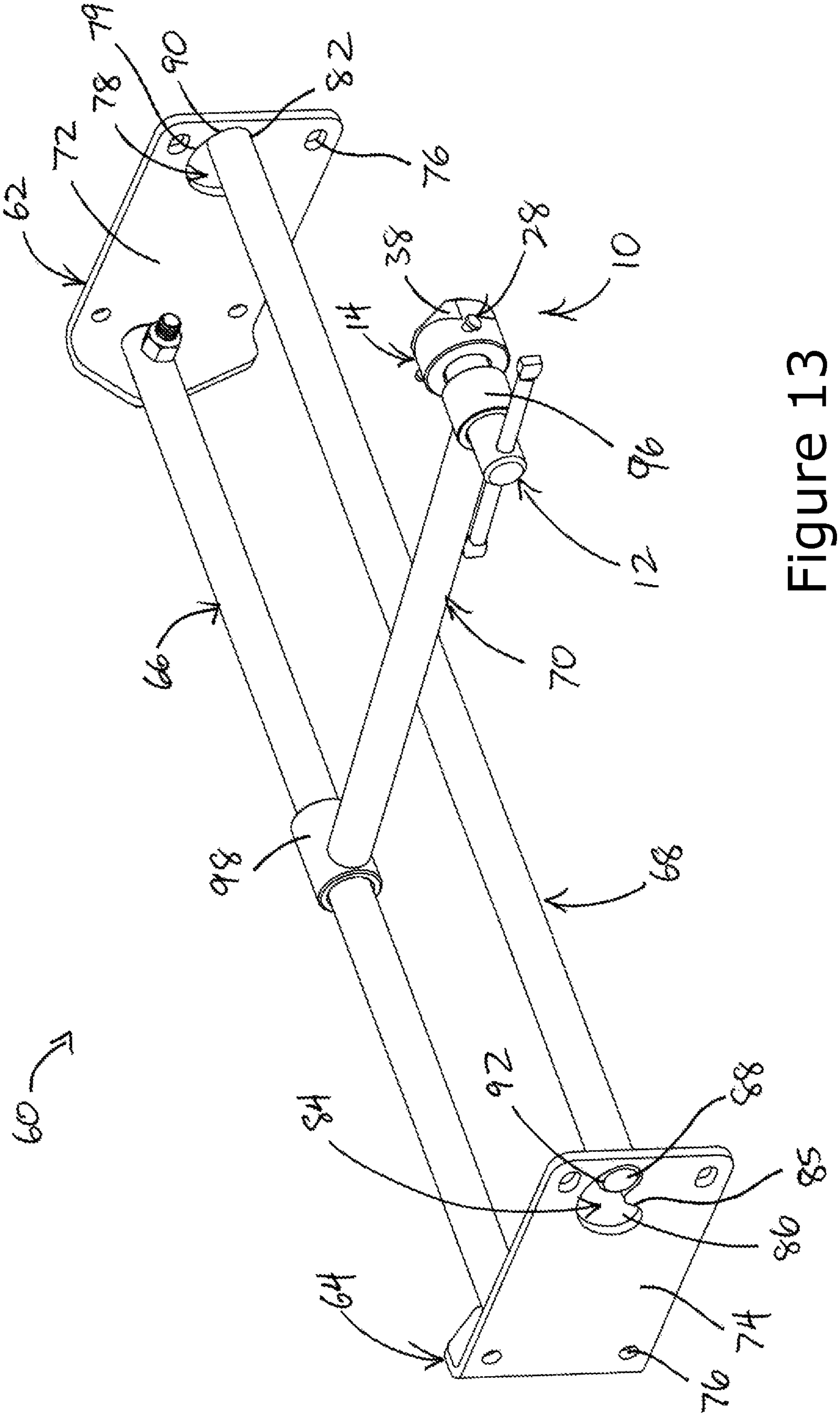
FIG. 13 is a rear perspective view of the set bar assembly and log dog of FIG. 12.
Figure 14:
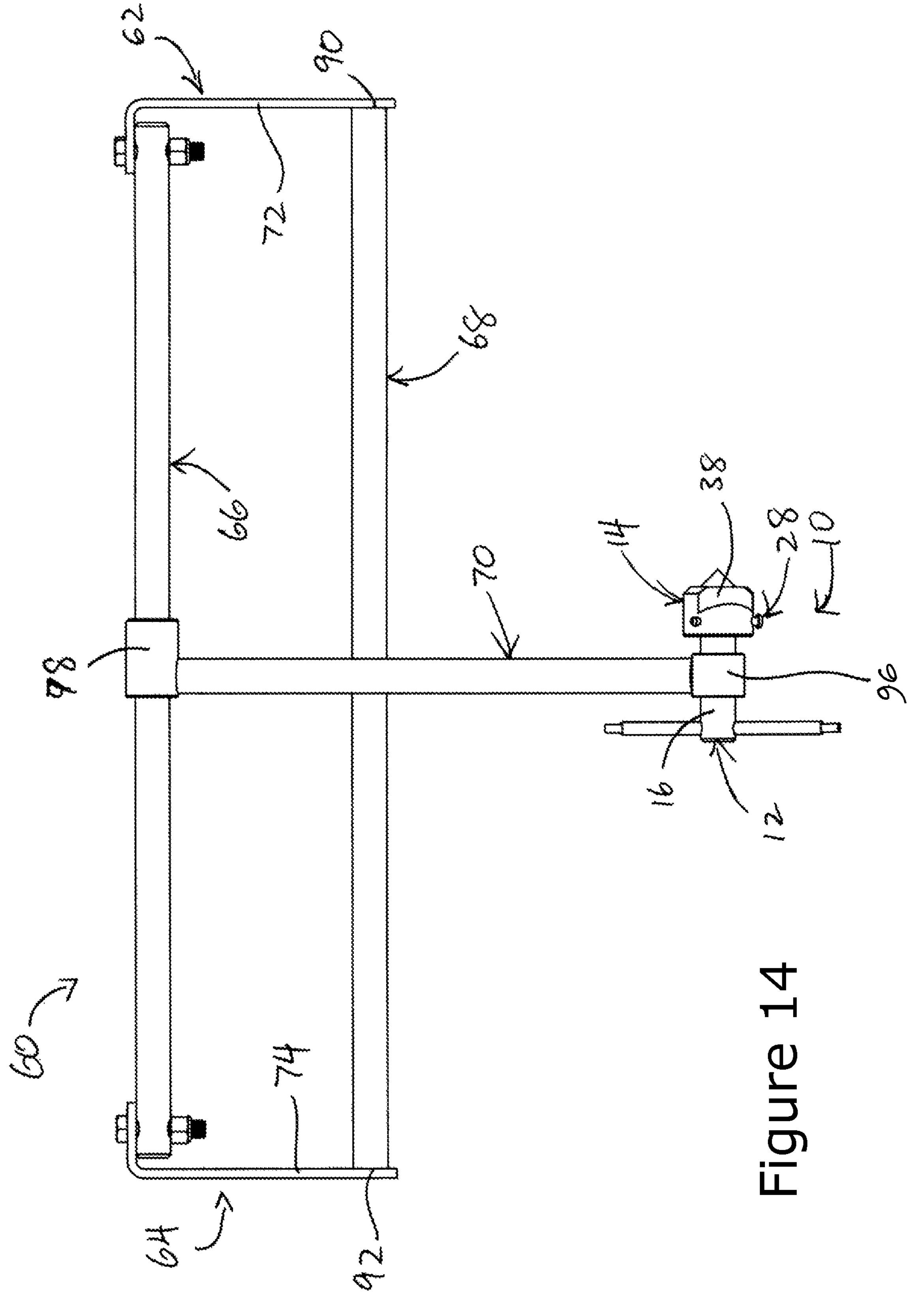
FIG. 14 is a plan view of the set bar assembly and log dog of FIG. 12.
Figure 15:
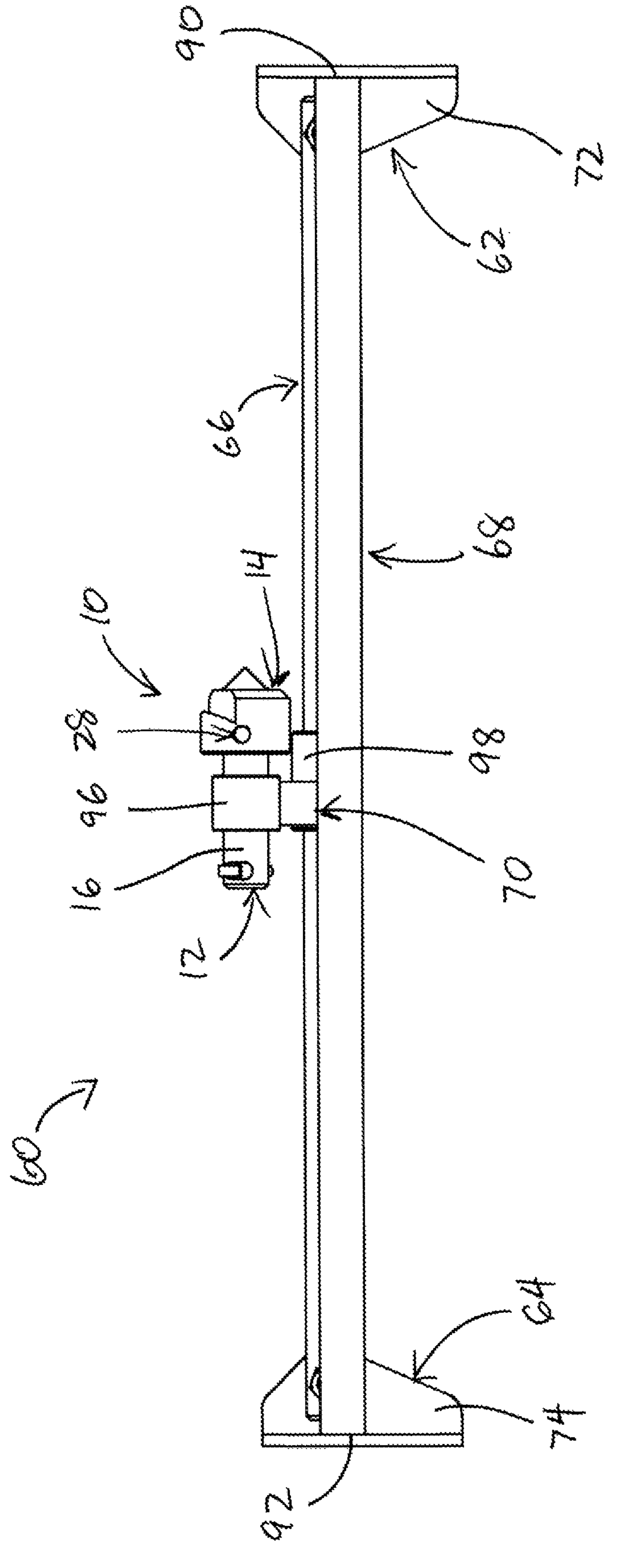
FIG. 15 is a rear elevational view of the set bar assembly and log dog of FIG. 12.
Figure 16:
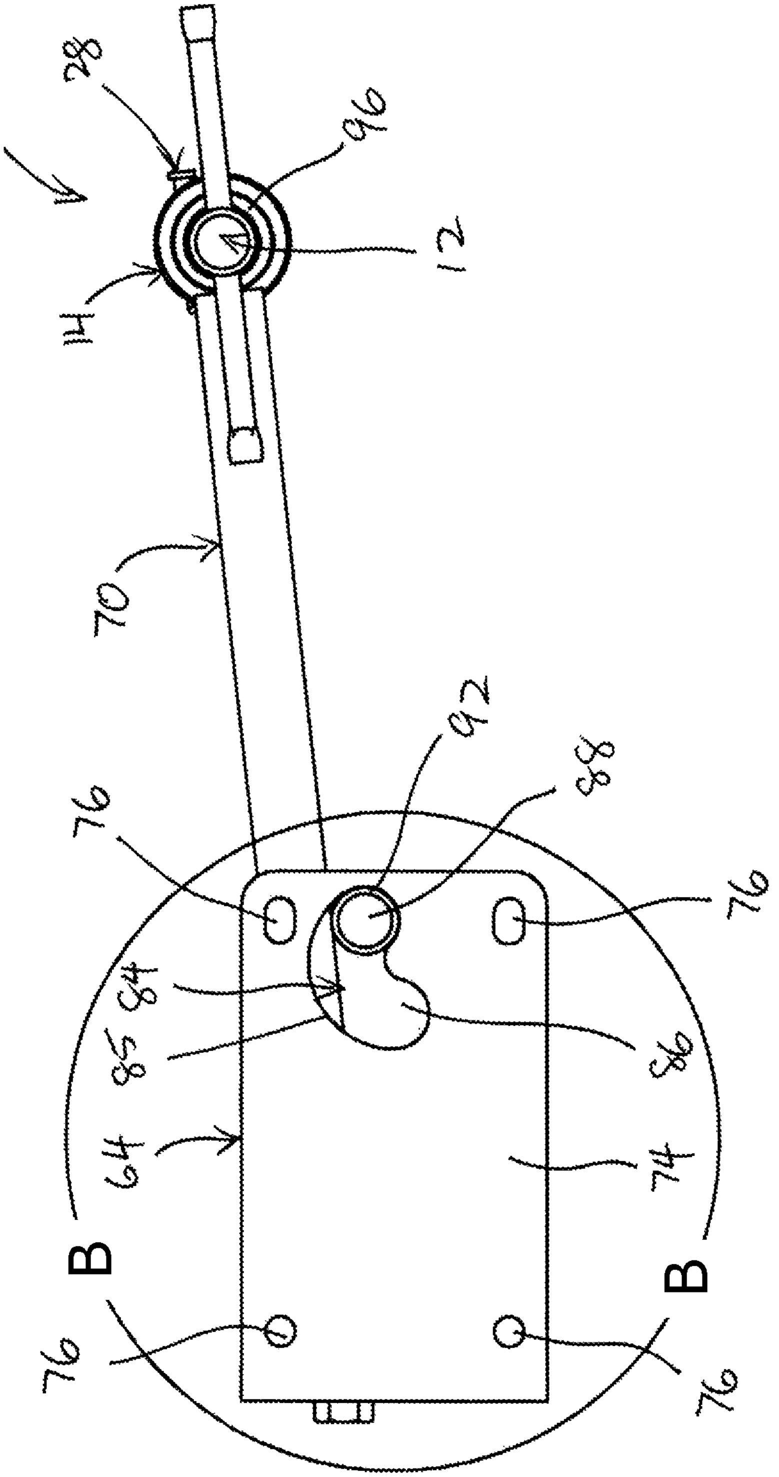
FIG. 16 is a side elevational view of the set bar assembly and log dog of FIG. 12.
Figure 17:
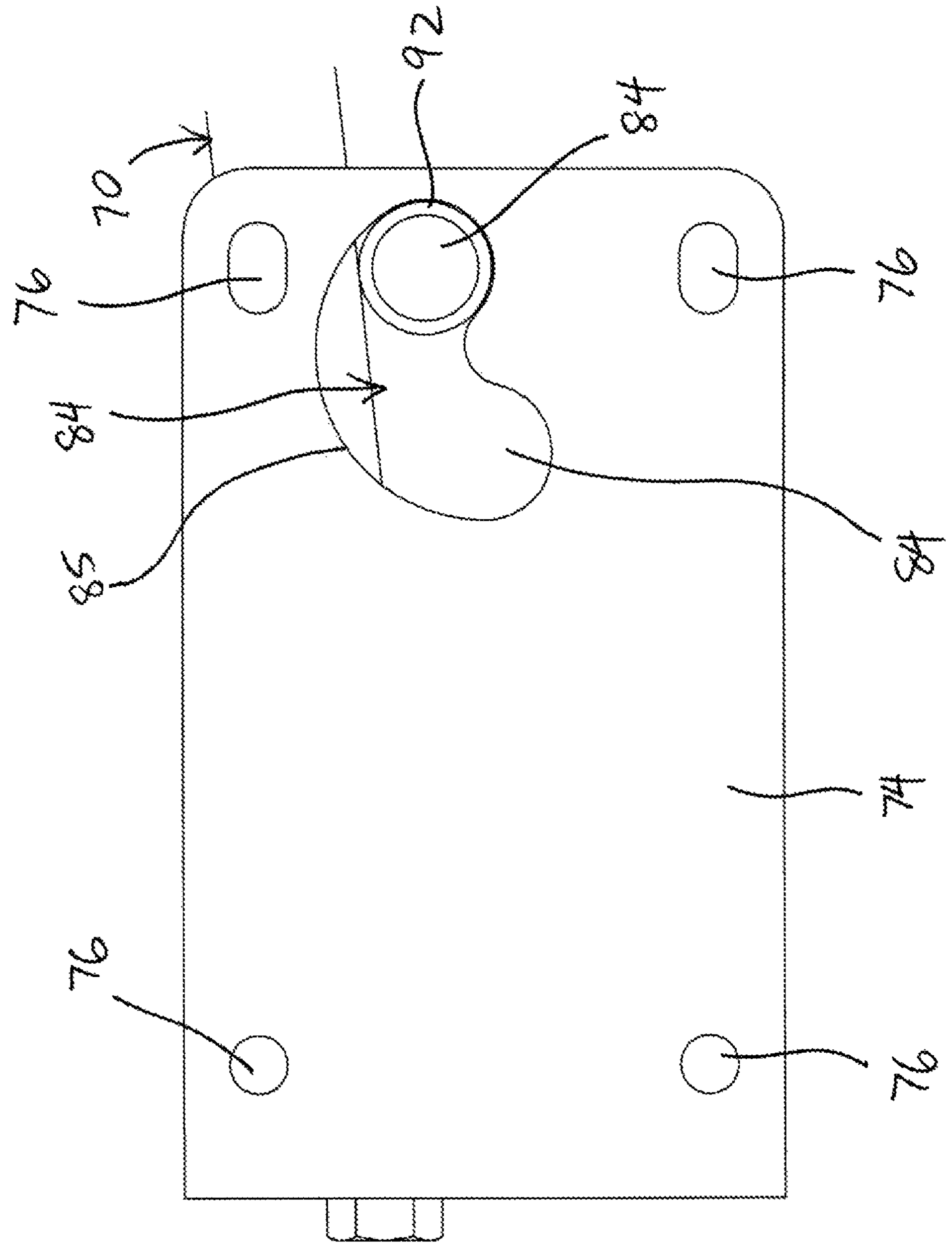
FIG. 17 is an enlarged view of portion B of FIG. 16.

In the present application, head 46 of pin 28 is situated proximate aperture 42 in sidewall 34, and tip 48 of pin 28 is situated proximate other aperture 44 in sidewall 34. As best seen in FIG. 6, as shaft 50 of pin 28 extends between apertures 42, 44, a portion of pin shaft 50 is received within groove 20. In that manner, shaft 50 of pin 28 has a diameter that generally corresponds with a diameter of groove 20. Alternately, other bore profiles can be used. For example, if groove 20 has a rectangular profile, shaft 50 of pin 28 may have a corresponding rectangular shape. Pin 28 may be held in place by an interference fit, by a nut secured to its far end, by a pin secured through its far end. Alternatively, pin 28 can be replaced with a bolt and a compatible threaded bore 26.

Figure 2:
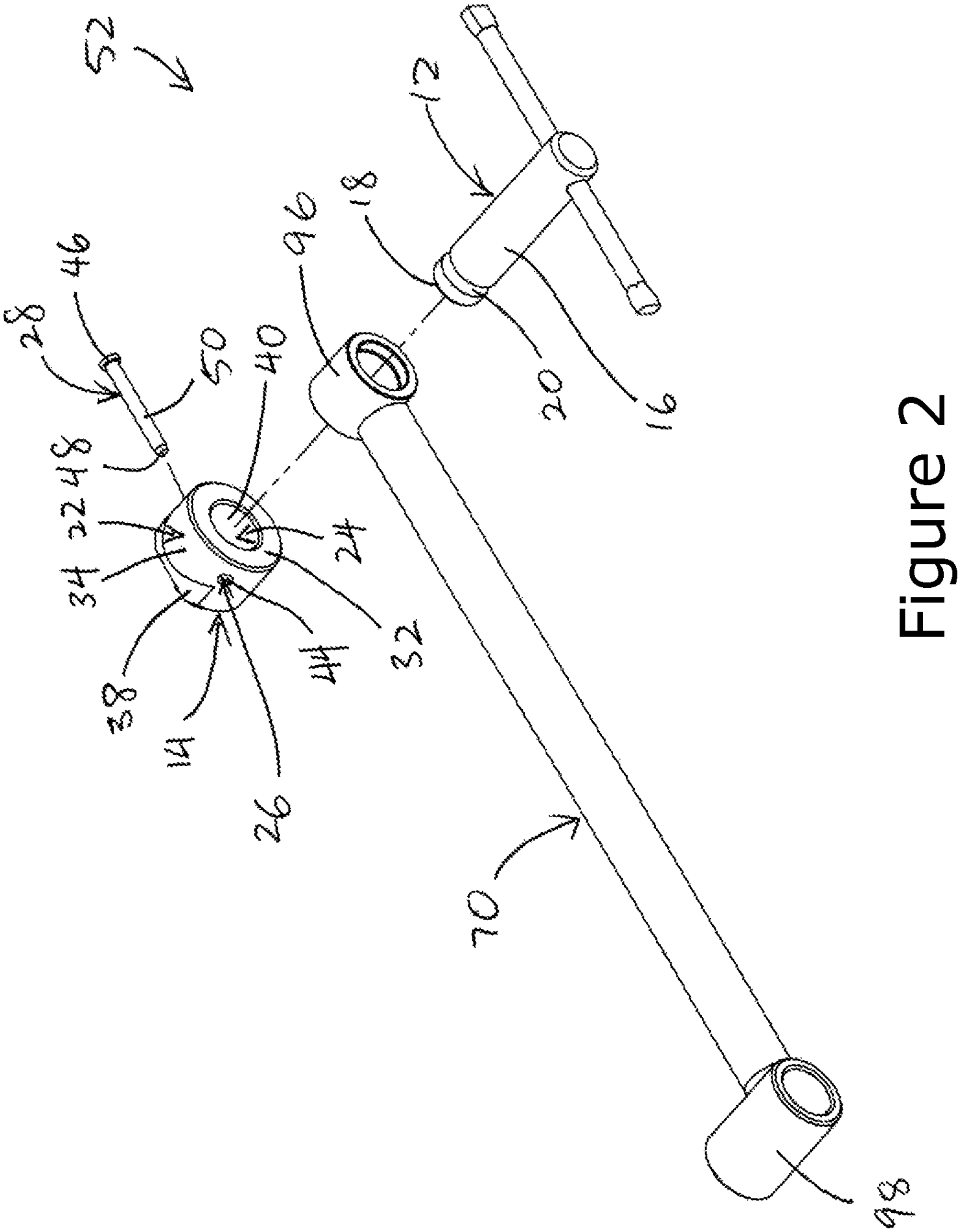
FIG. 2 is an exploded view of the log dog and pivot arm of FIG. 1.

In an alternate application, rather than a portion of pin shaft 50 being received within groove 20, bore 26 may instead be orientated to extend radially from aperture 42 towards cylindrical cavity 24 (FIG. 2, 6). In such a case, tip 48 of pin 28 may be received within groove 20 for engagement therewith.

The presence of pin 28 within bore 26 of head block 14 and groove 20 of rod 12 help to mechanically hold head block 14 onto rod 12 by way of an interference fit. As well, since pin 28 is slidable relative to groove 20, and groove 20 extends circumferentially around rod 12, rod 12 may rotate relative to head block 14 while pin 28 continues to hold or lock head block 14 to rod 12. In this manner is provided a head block 14 that is lockable, rotatable when locked, and releaseable.

The ability of rod 12 to rotate relative to head block 14 while being secured thereto, allows flat portion 38 to remain in contact with the log while an operator secures log dog 10 to the log bed. The slidable nature of pin 28 within bore 26 also allows pin 28 to easily be removed, thus allowing for head block 14 to be easily removed from rod 12 if desired.

Though not shown in the figures, head 46 of pin 28 may further include a gripping component for a user to grasp when inserting or removing pin 28 from head block 14. The gripping component may be a loop secured to pinhead 46 or an extension with indentations.

Thus, as best seen in FIG. 2, the present invention provides an effective means to releasably secure head block 14 to log dog 10.

For ease of transportation, log dog 10 may be provided in a kit 52 form, see FIG. 2, for a user to assemble into log dog 10 on their own. In such a case, kit 60 includes rod 12, head block 14, and pin 28 as described above. Rod 12 is adapted to be securable to the log bed, where rod 12 has connecting end 18 with groove 20 positioned proximate connecting end 18.

Kit 52 includes head block 14 for contacting the log on the log bed. Head block 14 has exterior surface 22 with front face 30, rear face 32 and sidewall 34 extending therebetween. Head block 14 has opening 40 at rear face 32 with cylindrical cavity 24 extending from opening 40 towards front face 30. Cylindrical cavity 24 is dimensioned to receive connecting end 18 and groove 20 of rod 12 therein. Head block 14 further has bore 26 extending through sidewall 34 into cylindrical cavity 24 for receiving pin 28.

Pin 28 is correspondingly dimensioned to releasably extend through bore 26 of head block 14 into cylindrical cavity 24 for engaging with groove 20 of rod 12 to releasably hold head block 14 to rod 12.

Log dog 10 and kit 52 may be used with existing log beds in conventional sawmills.

Turning to FIGS. 7-19, there is shown a set bar assembly 60 for securing a log dog to a log bed in a sawmill. Set bar assembly 60 may be adapted to be used with a number of different log dogs. In the embodiment depicted in FIGS. 12-19, the log dog secured to set bar assembly 60 is log dog 10 as described above.

Set bar assembly 60 generally includes first and second mounting brackets 62, 64, a support bar 66 and a stop bar 68, both extending between first and second mounting brackets 62, 64, and a pivot arm 70 pivotably coupled to support bar 66.

First and second mounting brackets 62, 64 are adapted to be secured to the log bed. First and second mounting brackets 62, 64 each comprise a first plate and a second plate 72, 74, respectively. Each plate has mounting apertures 76, which are dimensioned to receive a fastener therethrough for securement to the log bed.

First mounting bracket 62 has a first holder 78 with a lower section 80 and an upper section 82. Upper section 82 is vertically spaced apart or offset from lower section 80. Lower section 80 and upper section 82 of first holder 78 are configured to receive and hold an end of stop bar 68. In that regard, first holder 78 may be a pair of vertically spaced ledges or ridges, where the lower ledges may be lower section 80 and the other higher ledge may be upper section 82.

In the presently depicted embodiment, first holder 78 is a first cutout 79 in the shape of an inverted bean, or an inverted J-shape, where the bottom portions of the bean shape are lower section 80 and upper section 82. In some applications, rather than an inverted bean shape, first cutout 79 may have a more angular shape.

The present embodiment also includes a second holder 84 in second mounting bracket 64 with another lower section 86 and another upper section 88, where other lower section 86 is also vertically offset from other upper section 88. As shown in the Figures, similar to first holder 78, second holder 84 may be a second cutout 85. In the present embodiment, second cutout 85 is a mirror image of first cutout 79.

In other applications, second cutout 85 may have a different shape than, that is not a mirror image of, first cutout 79. In yet further applications, second mounting bracket 64 may not have a cutout at all.

Support bar 66 is secured to, and between, first and second mounting brackets 62, 64. For example, as shown, each end of support bar 66 is rigidly secured to first and second mounting brackets 62, 64 with a bolt and washer.

Stop bar 68 also extends between first and second mounting brackets 62, 64, generally parallel to support bar 66. However, unlike support bar 66, stop bar 68 is slidably or moveably coupled to first and second mounting brackets 62, 64.

In that regard, stop bar 68 has a first end 90 that is dimensioned to be received within or held by lower section 80 or upper section 82 of first holder 78 (depicted as first cutout 79) in first mounting bracket 62, and moveable/slidable therebetween. Stop bar 68 further has a second end 92. In applications where second mounting bracket 64 does not have a holder or cutout, second end 92 of stop bar 68 may simply be pivotably or loosely coupled to second mounting bracket 64.

The stop bar 68, when in the upper slot of the bean shaped first and second holders (78, 84) is calibrated to position the log dog 10 such that the operator can, without time-consuming adjusting and second-guessing, clamp the log dog and cut, confident that his blade will not run into the log dog. Without that, operators may place the log dog 10 too low and it vibrates off of the log, or they may place it too high such that the blade cuts into the log dog and the log dog damages the blade.

The stop bar 68, when in the lower slot of the bean shaped first and second holders (80, 86) is calibrated to position the log dog 10 out of the plane of the log bed, so that it is not an obstacle when handling, moving and rotating the log, but so that it remains within easy reach of the operator, without time-consuming adjusting and second-guessing.

Figure 18:
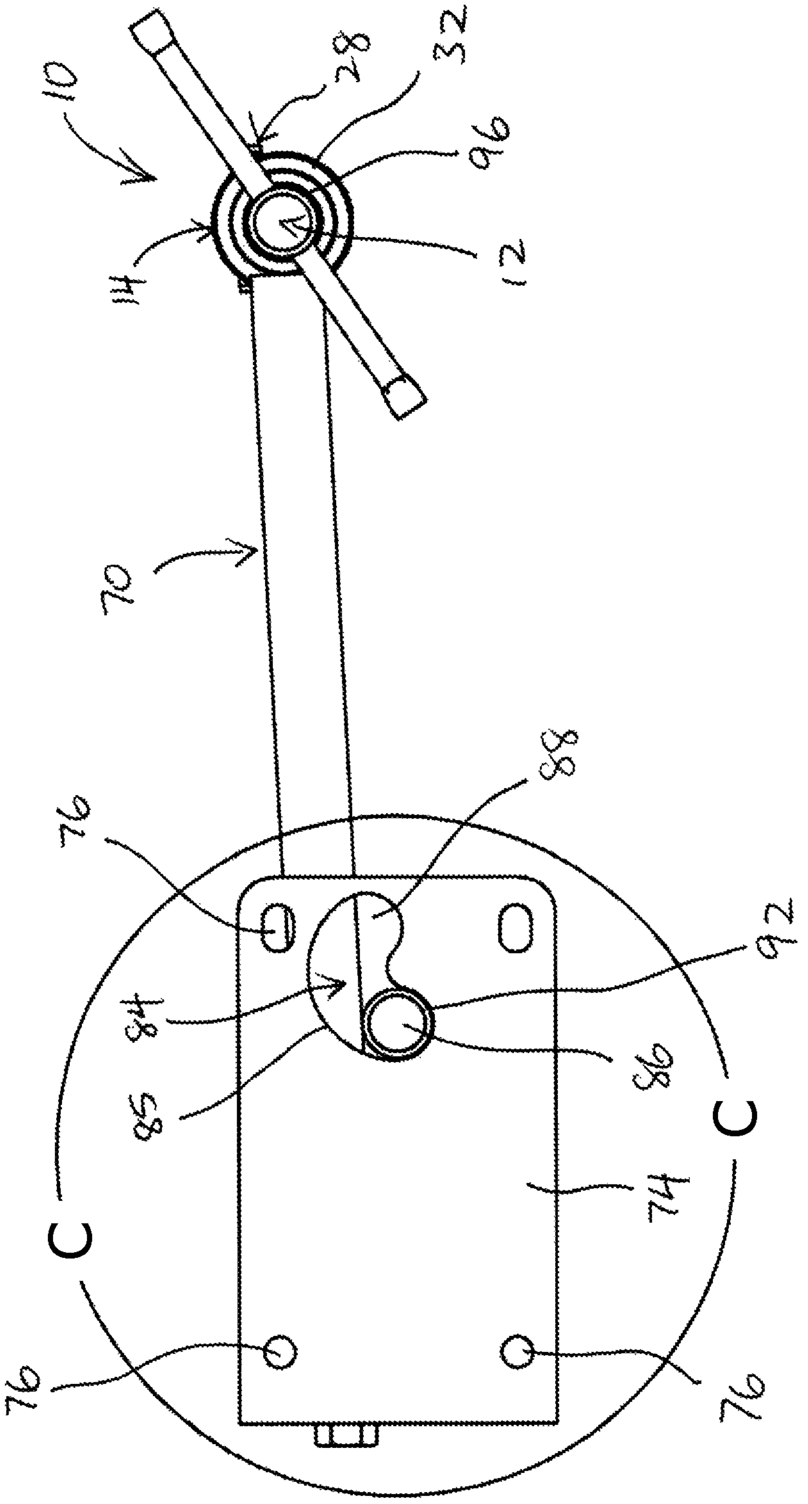
FIG. 18 is a side elevational view of the set bar assembly and log dog of FIG. 16 with one end of the stop bar in the lowered configuration.
Figure 19:
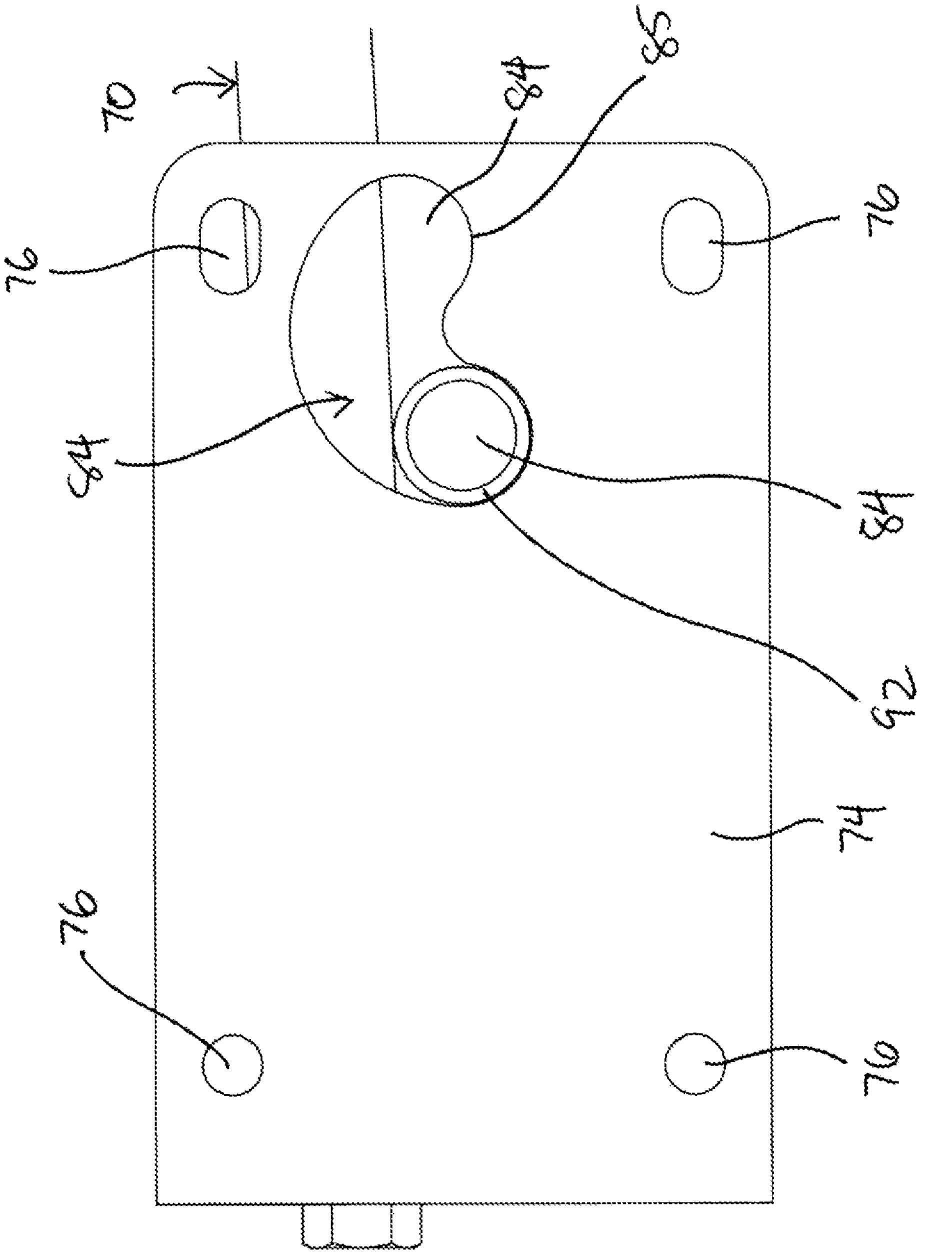
FIG. 19 is an enlarged view of portion C of FIG. 18.
Figure 20:
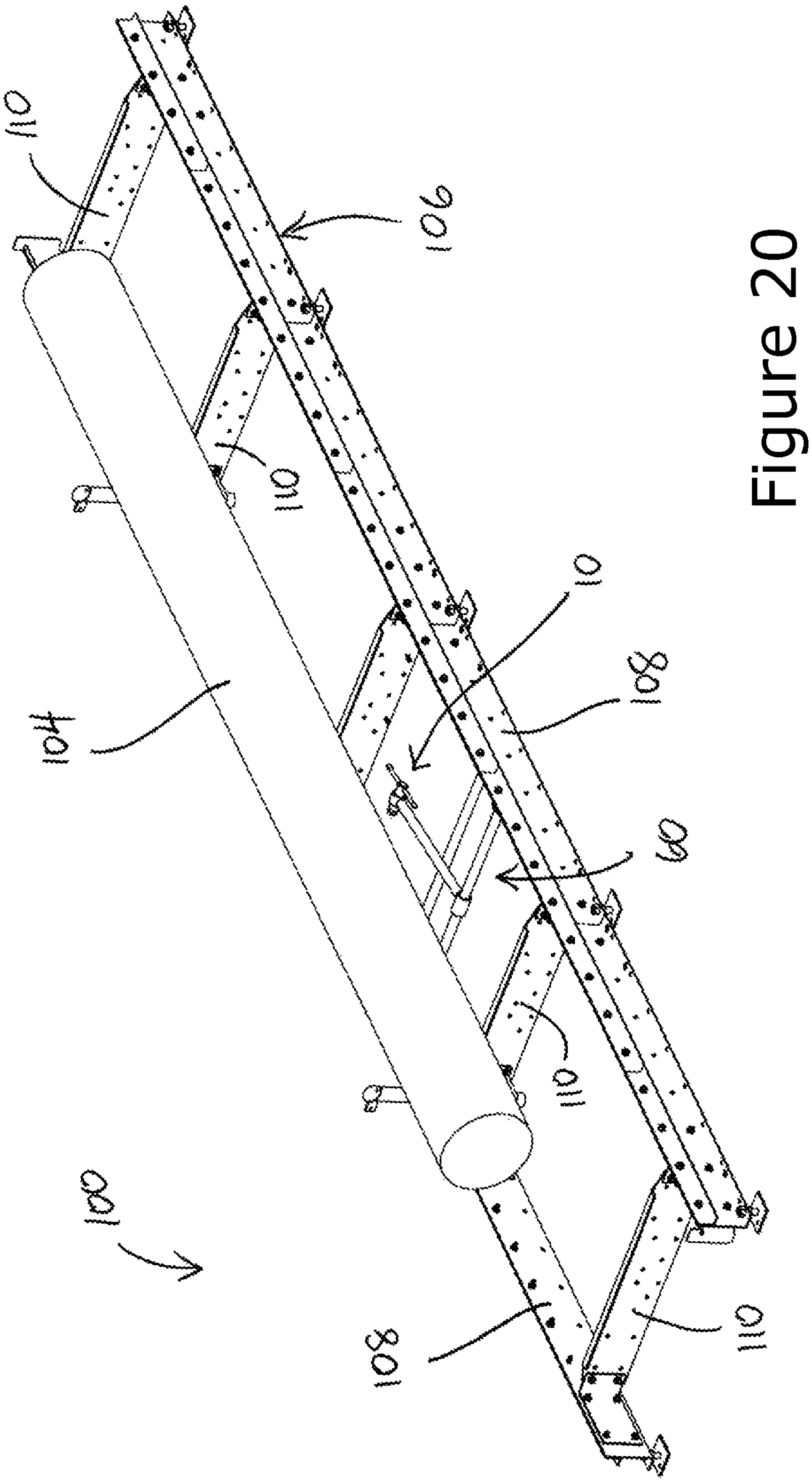
FIG. 20 is a view of a log bed with a log and the set bar assembly and the log dog of FIG. 18 incorporated therein.
Figure 21:
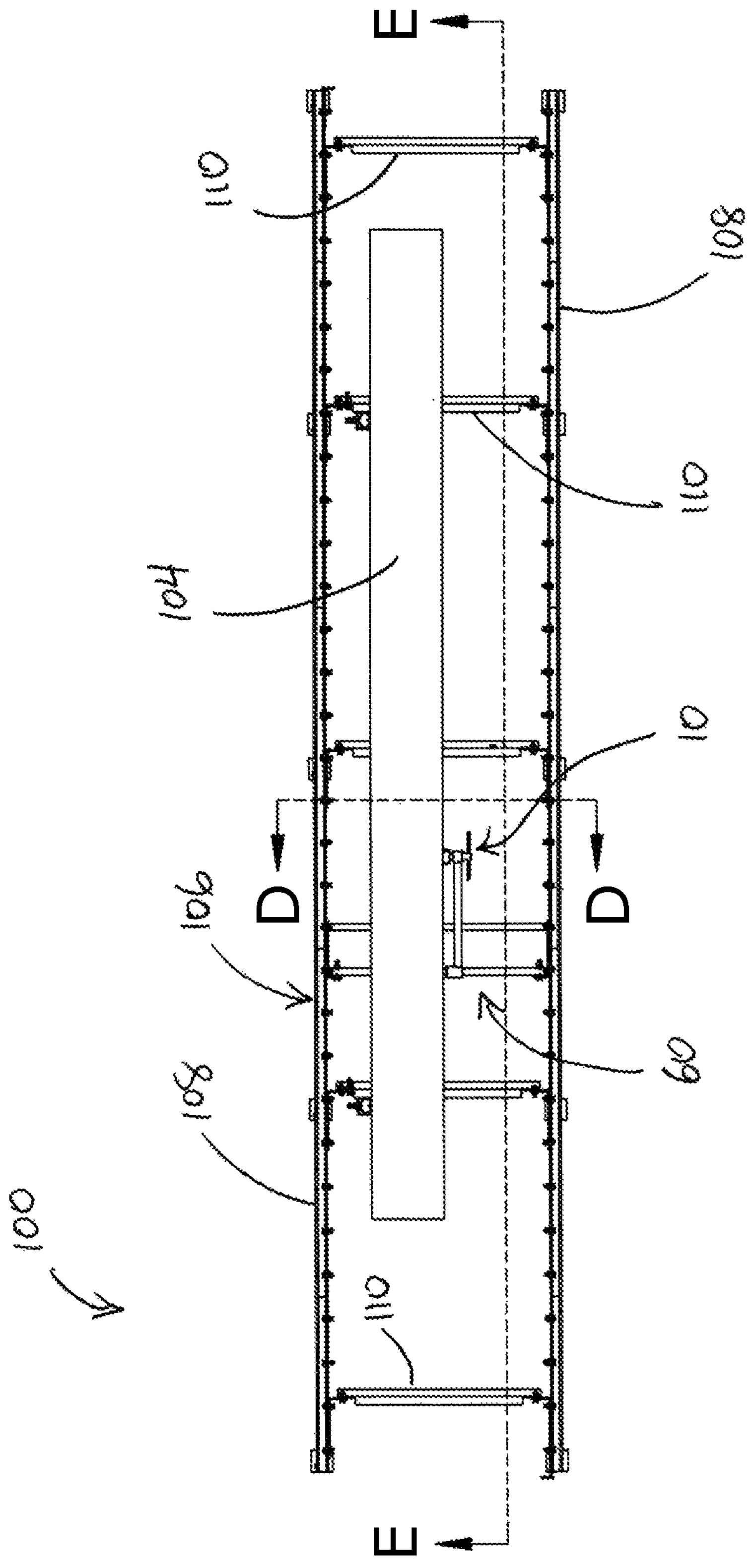
FIG. 21 is a plan view of FIG. 20.
Figure 22:
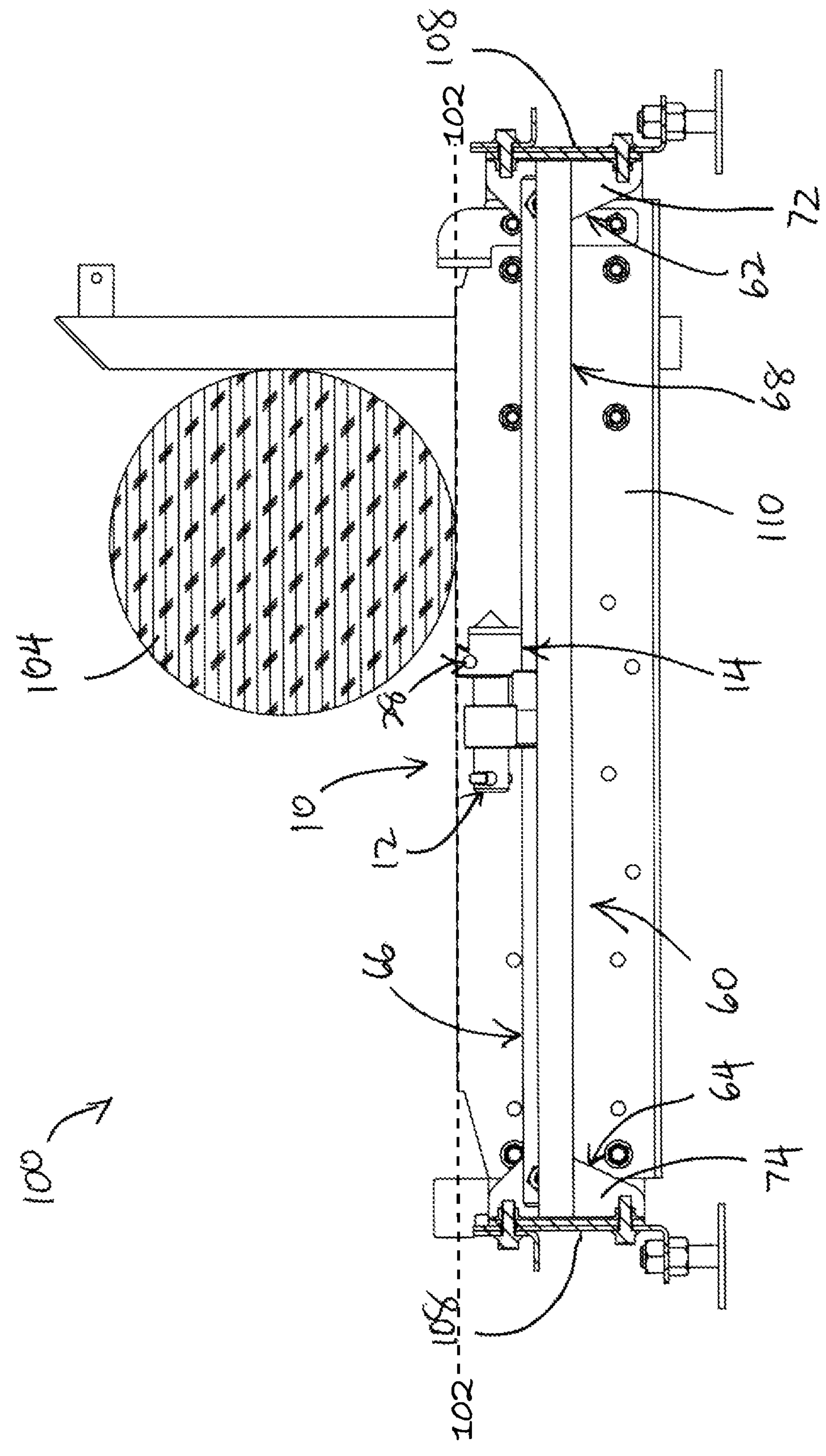
FIG. 22 is a cross-sectional view along line D-D in FIG. 20 with the stop bar in the lowered configuration.

In applications where second mounting bracket 64 does have second holder 84 (depicted as second cutout 85), second end 92 is dimensioned to be received within or held by other lower or other upper sections 86, 88 of second cutout 85, and moveable therebetween. FIGS. 7-17 show first and second ends 90, 92 of stop bar 68 positioned within upper section 82 and other upper section 88. FIGS. 18-19 show first and second ends 90, 92 of stop bar 68 positioned within lower section 80 and other lower section 86.

Pivot arm 70 is pivotably coupled to support bar 66 for operative engagement with stop bar 68. As shown, pivot arm 70 extends generally perpendicularly from support bar 66 to a distal end 94. Distal end 94 is configured to be releasably secured to log dog 10. In the present application, distal end 94 is a ring 96 through which rod 12 of log dog 10 may be received and secured (FIG. 2).

As depicted, pivot arm 70 is operatively engaged with support bar 66 by simply resting on support bar 66. In alternate applications, pivot arm 70 may be more securely connected or coupled to support bar 66 via a coupling bracket.

Further, in the depicted embodiment, pivot arm 70 is slidably coupled to support bar 66 with a pivot bracket 98. In that manner, pivot bracket 98 allows pivot arm 70 to both pivot around support bar 66 and slide transversely along support bar 66.

Since lower sections 80, 86 are vertically offset or spaced apart from upper section 82, 88, respectively, moving first end 90 and second 92 of stop bar 68 to lower sections 80, 86 of first and second cutouts 79, 85, lowers pivot arm 70 relative to mounting brackets 62, 64. Consequently, moving first end 90 and second end 92 of stop bar 68 to upper sections 82, 88 of first and second cutouts 79, 85 raises pivot arm 70 relative to first and second mounting brackets 62, 64.

In cases where only first mounting bracket 62 has first cutout 79, moving first end 90 of stop bar 68 to lower section 80 of first cutout 79 is sufficient to lower pivot arm 70 relative to mounting brackets 62, 64. Moving first end 90 to upper section 82 is sufficient to raise pivot arm 70 relative to mounting brackets 62, 64.

FIGS. 7-17 show set bar assembly 60 in the raised configuration, while FIGS. 18-19 show set bar assembly 60 in the lowered configuration.

FIGS. 20-25 illustrate a log bed 100 for use in a sawmill, where log bed 100 defines a top plane 102 (indicated by dashed lines in FIGS. 22-25) on which a log 104 is supported.

Log bed 100 comprises a deck 106, which has a pair of rails 108, and multiple cross bunks 110 extending between rails 108.

Log bed 100 further includes set bar assembly 60 as described above, where first and second mounting brackets 62, 64, are secured to deck 106. In some applications, set bar assembly 60 may be secured to cross bunks 110. In the depicted embodiment, first mounting bracket 62 is secured to one of rails 108, while second mounting bracket 64 is secured to the other rail 108. Secured in that manner, support bar 66 and stop bar 68 extend generally parallel to cross bunks 110 and generally parallel to top plane 102. Pivot arm 70, in turn, extends generally perpendicular to cross bunks 100.

Moving first end 90 and second 92 of stop bar 68 to lower sections 80, 86 of first and second cutouts 79, 85, brings set bar assembly 60 into the lowered configuration and lowers log dog 10 below top plane 102 of log bed 100 (see FIG. 22) and out of the way of log 104. Moving first end 90 and second 92 of stop bar 68 to upper sections 82, 88 of first and second cutouts 79, 85, brings set bar assembly 60 into the raised configuration and raises at least a portion of log dog 10 above top plane 102 of log bed 100 for engagement with log 104 (see FIG. 25).

Figure 23:
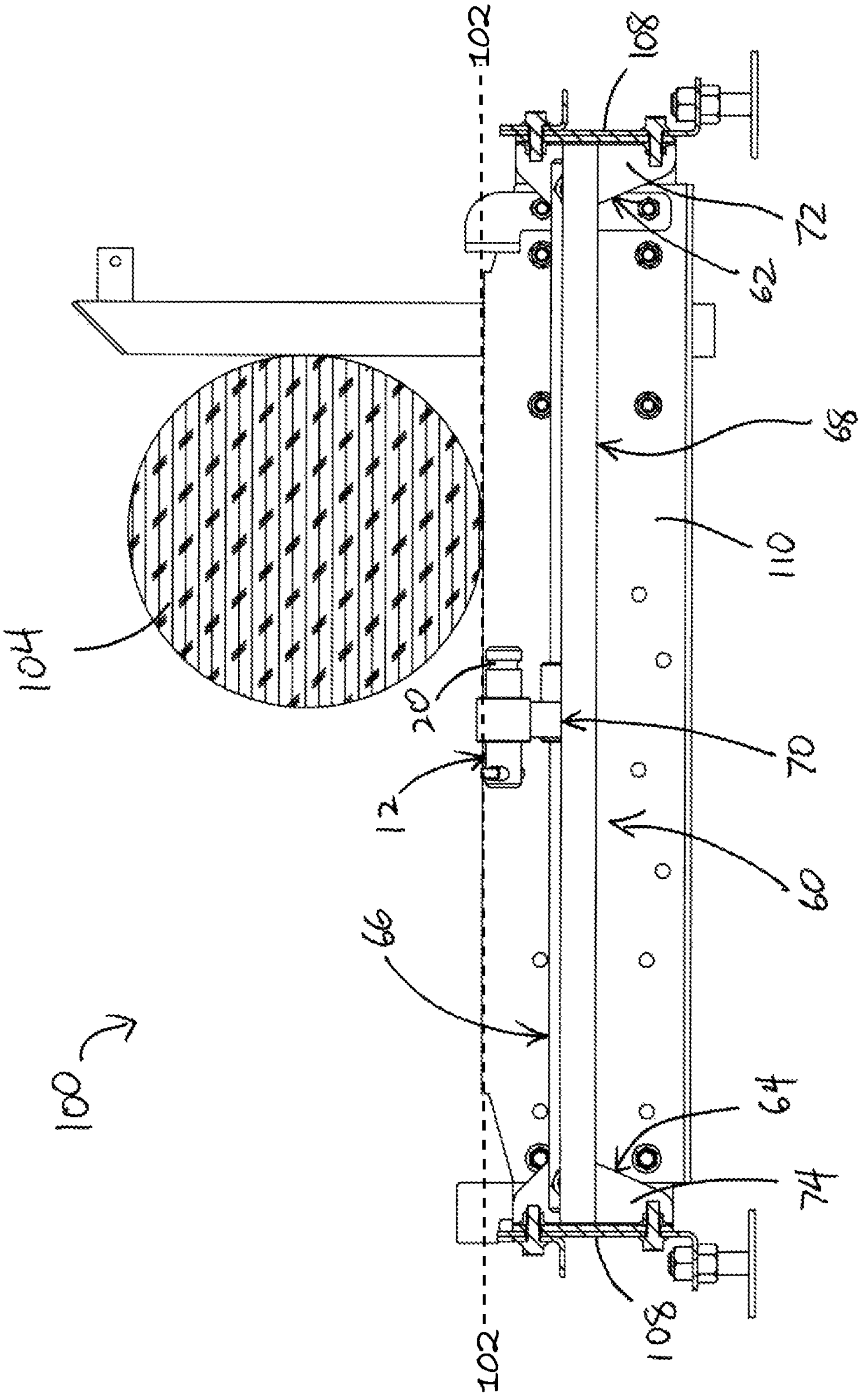
FIG. 23 is a view of FIG. 22 with the stop bar in the raised configuration without the head block.
Figure 24:
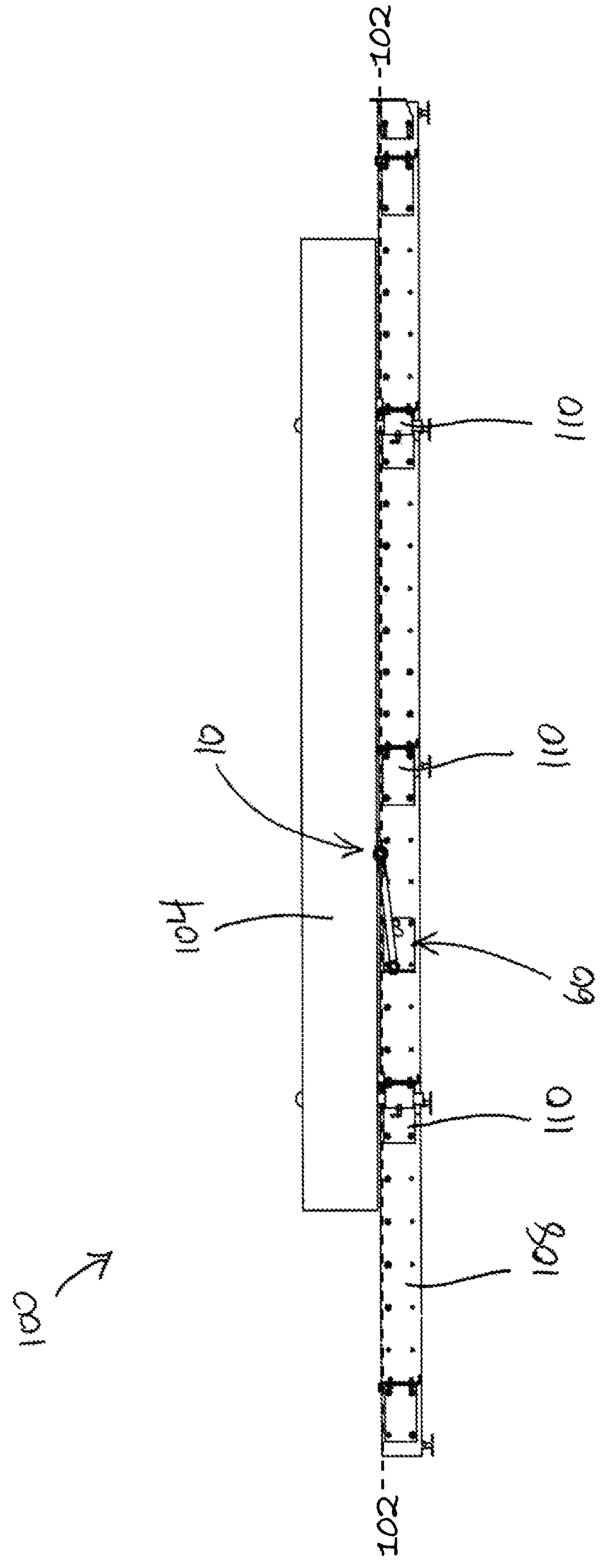
FIG. 24 is a cross-sectional view along line E-E in FIG. 20 with the stop bar in the raised configuration.

Alternately, in some applications, rather than lowering log dog 10 below top plane 102, head block 14 may simply be removed from rod 12 by removing pin 28, while set bar assembly 60 is in the raised configuration (see FIG. 23). This also allows log 104 to be handled without log dog 10 getting in the way.

In cases where only first mounting bracket 62 has first cutout 79, set bar assembly 60 is configured such that moving first end 90 of stop bar 68 to lower section 80 of first cutout 79 is sufficient to lower log dog 10 below top plane 102. Moving first end 90 to upper section 82 is sufficient to raise at least a portion of log dog 10 above top plane 102 for engagement with log 104.

As noted above, log bed 100 may be part of a sawmill (not shown, see, for example U.S. Pat. No. 8,261,647, incorporated herein by reference) where log bed 100 defines a first translation axis. The sawmill further include a carriage mounted to log bed 100 for movement along the first translation axis, and a sawhead secured to the carriage for movement along the first translation axis relative to log bed 100.

In this manner, when a user is loading or rotating log 104 on deck 106, and log dog 10 is not required, set bar assembly 60 may be brought into the lowered configuration to "hide" log dog 10 below top plane 102, and out of the way of the user. When a user wishes to hold log 104 in place with log dog 10, set bar assembly 60 may be brought into the raised configuration and adjusted bring flat portion 38 of log dog 10 above top plane 102 and into contact with a cut side of log 104.

All that is required to move set bar assembly 60 between the lowered and raised configurations is to move stop bar 68 between the upper and lower sections of the cutouts.

Stop bar 68 thus provides several benefits. Known log dog arms swing down towards the ground when not used, which makes them inconvenient to grab later. Stop bar 68 holds pivot arm 70 near the level of the log bed when not in use so that it is easily accessible to the operator when it is next needed. Second, stop bar 68 can hold pivot arm 70 low enough so as to be fully below the cross bunks and the log/cant and thus completely out of the way when the sawyer is loading or turning his log/cant (i.e. it does not interfere with his wood handling operations).

Figure 25:
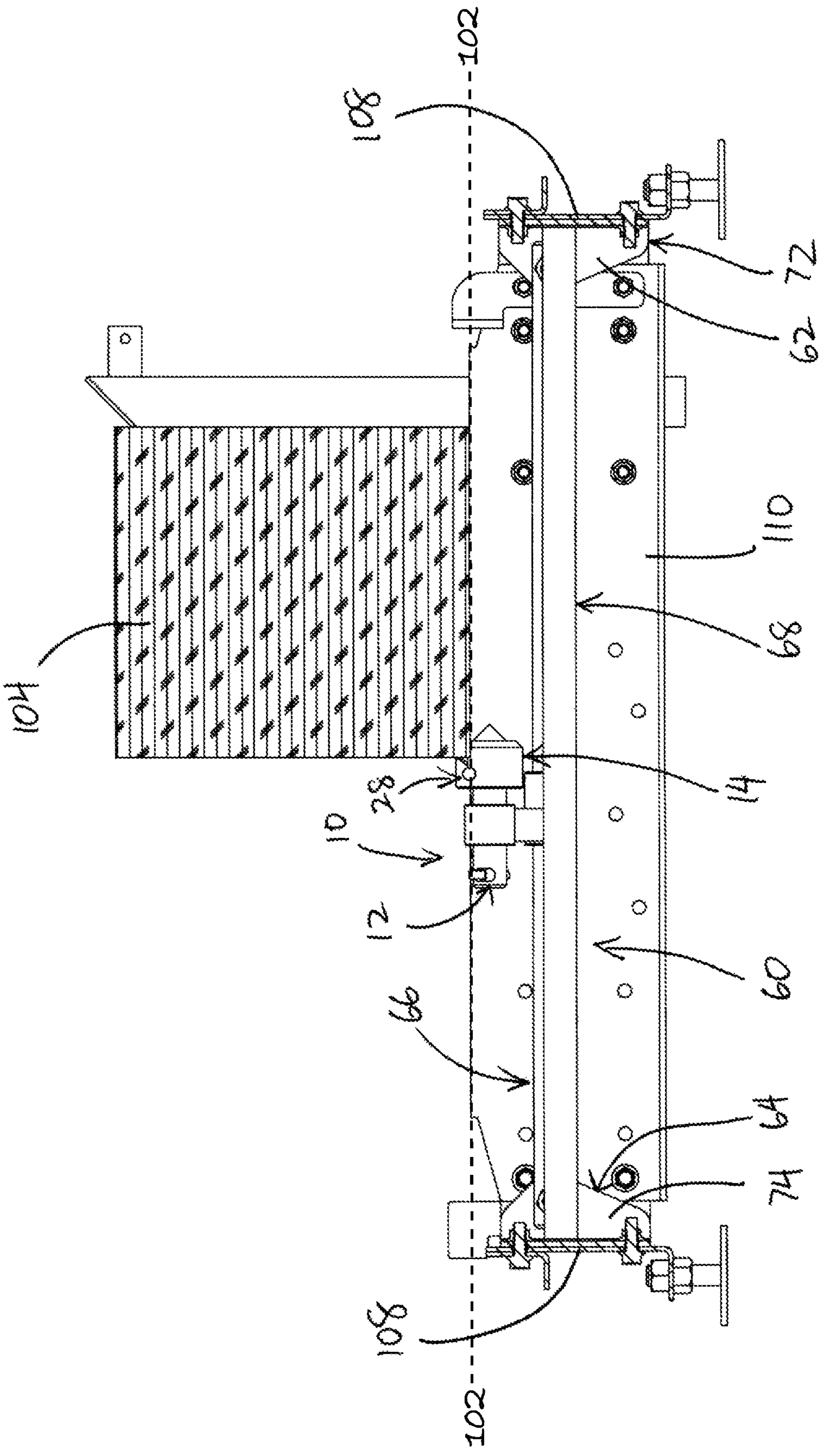
FIG. 25 is a view of FIG. 22 with the set bar assembly in the raised configuration in use with a cut log.

Third, as best seen in FIG. 25, stop bar 68 can be adjusted be means of the bean shaped first and second holders (78, 84) quickly and easily to position the log dog 10 so that it clamps the very bottom of a cant/beam/plank. This is important because sawyers often want to mill boards that can be quite thin (e.g. 1 inch). If the log dog 10 or holds the cant/beam/plank at a position on the cant/beam/plank which is too high, then the operator cannot run the blade low enough to continue making thin boards. The rule of thumb is sawyers want to be able to cut to within 1 inch of the bed. However, with known log dogs, it is difficult to position the log dog at such a low level while firmly holding the cant/beam/plank. If the log dog 10 is held too high, it may be nicked by the blade passing overhead. The distance/margin for error can be very small.

The invention thus provides a log dog and associated set bar that is simple and low cost, easy to use, set, adjust, and maintain.

It is to be understood that what has been described are the preferred embodiments of the invention. The scope of the claims should not be limited by the preferred embodiments set forth above, but should be given the broadest interpretation consistent with the description as a whole.

The invention claimed is:

1. A log bed assembly comprising:

a log dog for holding a log in place on a log bed in a sawmill; and a deck including a pair of rails and multiple cross bunks extending between the rails for securing the log dog, wherein the log dog comprises:

a rod having a connecting end with a groove positioned proximate the connecting end; and a head block for contacting the log on the log bed, the head block releasably coupled to the rod and having:

a front face, a rear face and a sidewall extending therebetween, a cylindrical cavity extending from the rear face towards the front face, the cylindrical cavity dimensioned to receive the connecting end and the groove of the rod;

a bore extending through the sidewall to the cylindrical cavity; and a pin removably extending through the bore to the cylindrical cavity and engaging with the groove of the rod to hold the head block to the rod, wherein the bore and the pin extend from an aperture in the sidewall, generally tangential to the cylindrical cavity, to another aperture in the sidewall.

2. The log bed assembly of claim 1, wherein the pin has a head, an opposed tip, and a shaft therebetween, at least a portion of the shaft being situated within the cylindrical cavity for engagement with the groove of the rod.

3. The log bed assembly of claim 2, wherein the groove on the rod extends circumferentially around the rod.

4. The log bed assembly of claim 3, wherein the groove has a half-circle, cross-sectional shape with a diameter that generally corresponds with a diameter of the shaft of the pin.

5. A log bed assembly kit comprising:

a log dog kit for assembling into a log dog for holding a log in place on a log bed in a sawmill; and a deck including a pair of rails and multiple cross bunks extending between the rails for securing the log dog, wherein the log dog kit comprises:

a rod having a connecting end with a groove positioned proximate the connecting end;

a head block for contacting the log on the log bed, the head block having:

a front face, a rear face and a sidewall extending therebetween, a cylindrical cavity extending from rear face towards the front face, the cylindrical cavity dimensioned to receive the connecting end and the groove of the rod therein; and a bore extending through the sidewall to the cylindrical cavity; and a pin dimensioned to extend through the bore of the head block to the cylindrical cavity for engaging with the groove of the rod to releasably hold the head block to the rod, wherein the pin has a head, an opposed tip, and a shaft therebetween for engagement with the groove of the rod within the cylindrical cavity when the pin is situated in the bore.

6. The log bed assembly kit of claim 5, wherein the groove on the rod extends circumferentially around the rod.

7. The log bed assembly kit of claim 6, wherein the groove has a half-circle profile with a diameter that generally corresponds with a diameter of the shaft of the pin.

* * * * *